United States Patent
Breidenbach

(10) Patent No.: US 9,522,706 B1
(45) Date of Patent: Dec. 20, 2016

(54) AERODYNAMIC DRAG REDUCING APPARATUS

(71) Applicant: Thomas Scott Breidenbach, Maple Grove, MN (US)

(72) Inventor: Thomas Scott Breidenbach, Maple Grove, MN (US)

( * ) Notice: Subject to any disclaimer, the term of this patent is extended or adjusted under 35 U.S.C. 154(b) by 0 days.

(21) Appl. No.: 14/517,852

(22) Filed: Oct. 18, 2014

Related U.S. Application Data

(60) Provisional application No. 61/892,636, filed on Oct. 18, 2013.

(51) Int. Cl.
*B62D 35/00* (2006.01)

(52) U.S. Cl.
CPC .................. *B62D 35/001* (2013.01)

(58) Field of Classification Search
CPC ........................ B62D 35/001; B62D 35/002
USPC ...................................................... 296/180.4
See application file for complete search history.

(56) References Cited

U.S. PATENT DOCUMENTS

| | | | | |
|---|---|---|---|---|
| 6,799,791 B2 * | 10/2004 | Reiman | ................ | B62D 35/004 296/180.4 |
| 2008/0309122 A1 * | 12/2008 | Smith | .................. | B62D 35/001 296/180.1 |
| 2011/0084516 A1 * | 4/2011 | Smith | .................. | B62D 35/001 296/180.4 |
| 2013/0106136 A1 * | 5/2013 | Smith | .................. | B62D 35/001 296/180.4 |
| 2014/0367993 A1 * | 12/2014 | Breidenbach | ........ | B62D 35/001 296/180.4 |
| 2015/0035312 A1 * | 2/2015 | Grandominico | ..... | B62D 35/001 296/180.4 |
| 2016/0009322 A1 * | 1/2016 | Telnack | ............... | B62D 35/001 296/180.4 |

* cited by examiner

*Primary Examiner* — Jason S Morrow
(74) *Attorney, Agent, or Firm* — Thomas Scott Breidenbach

(57) ABSTRACT

An aerodynamic drag reducing apparatus is adapted for mounting behind a vehicle. The apparatus includes a first actuator that may reside adjacent one or more lock-rods of a rear door of the vehicle. The first actuator is adapted to deploy a first aerodynamic panel and/or frame of an aerodynamic assembly. The first actuator may be retracted by a tension member. A second actuator is adapted to deploy a second aerodynamic panel and/or frame of the aerodynamic assembly. When an operator or other means moves the second aerodynamic panel to a stowed position of the second panel, tension is developed in the tension member, and the first actuator is thereby retracted. The retraction of the first actuator may move the first panel to a stowed position of the first panel.

20 Claims, 35 Drawing Sheets

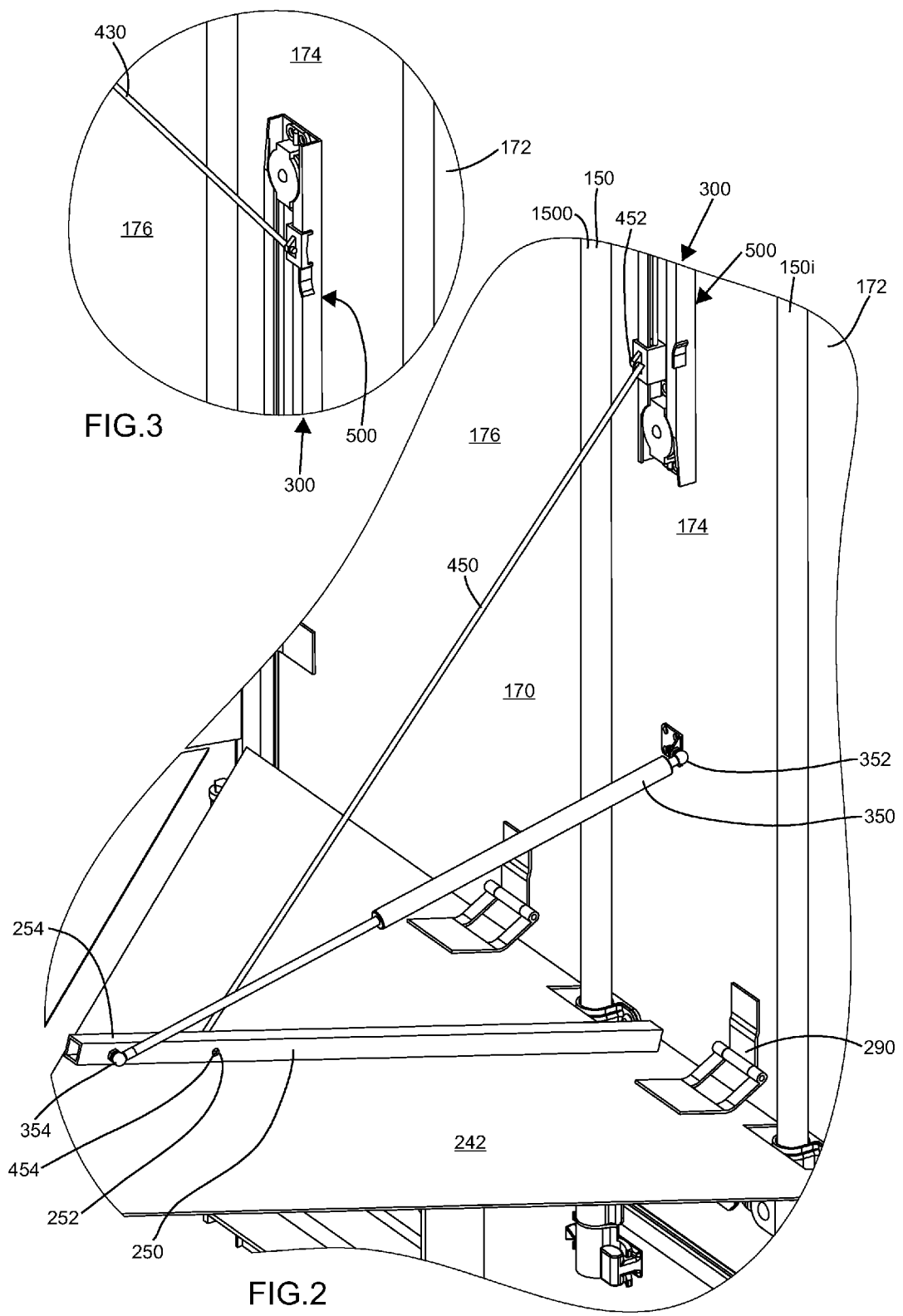

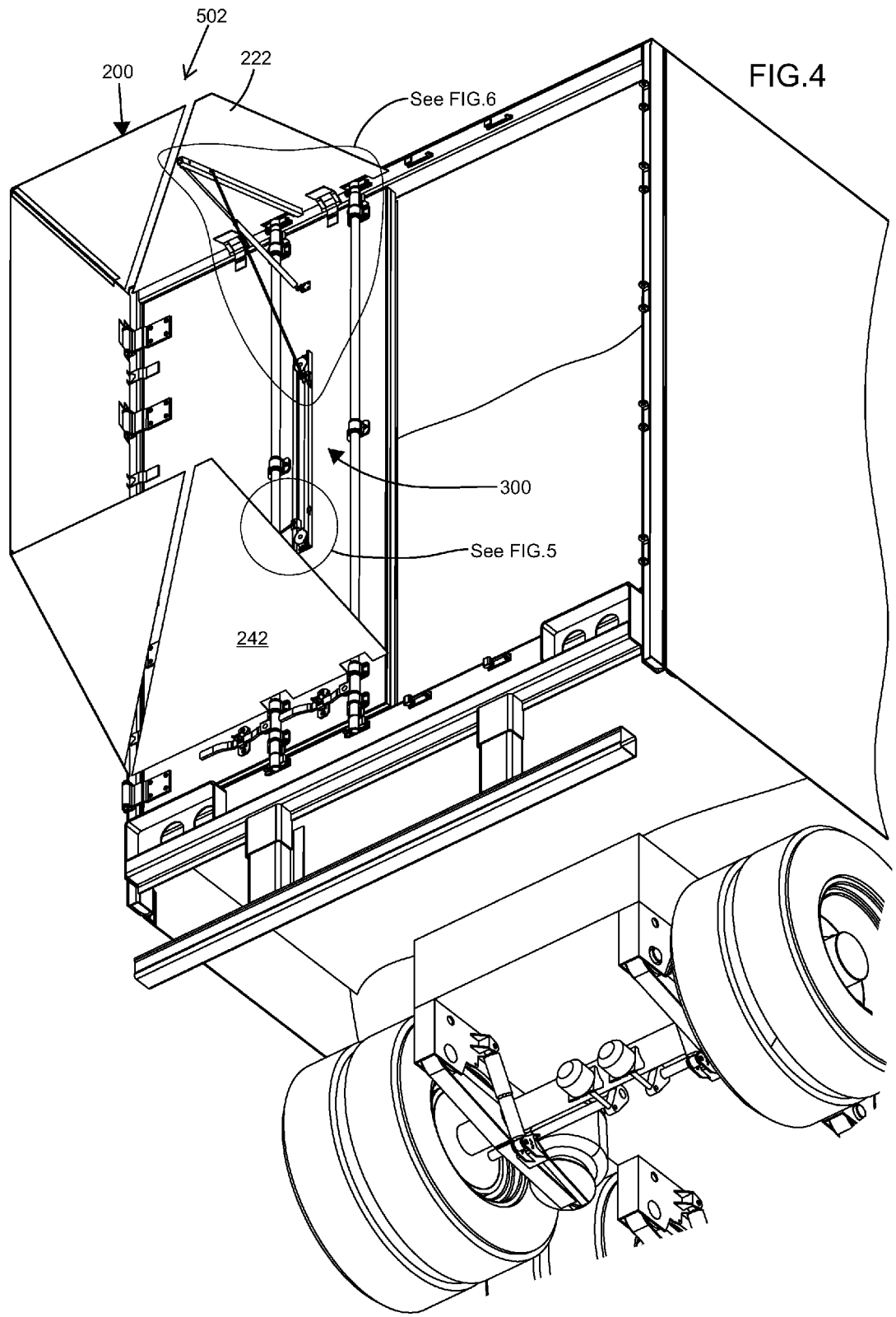

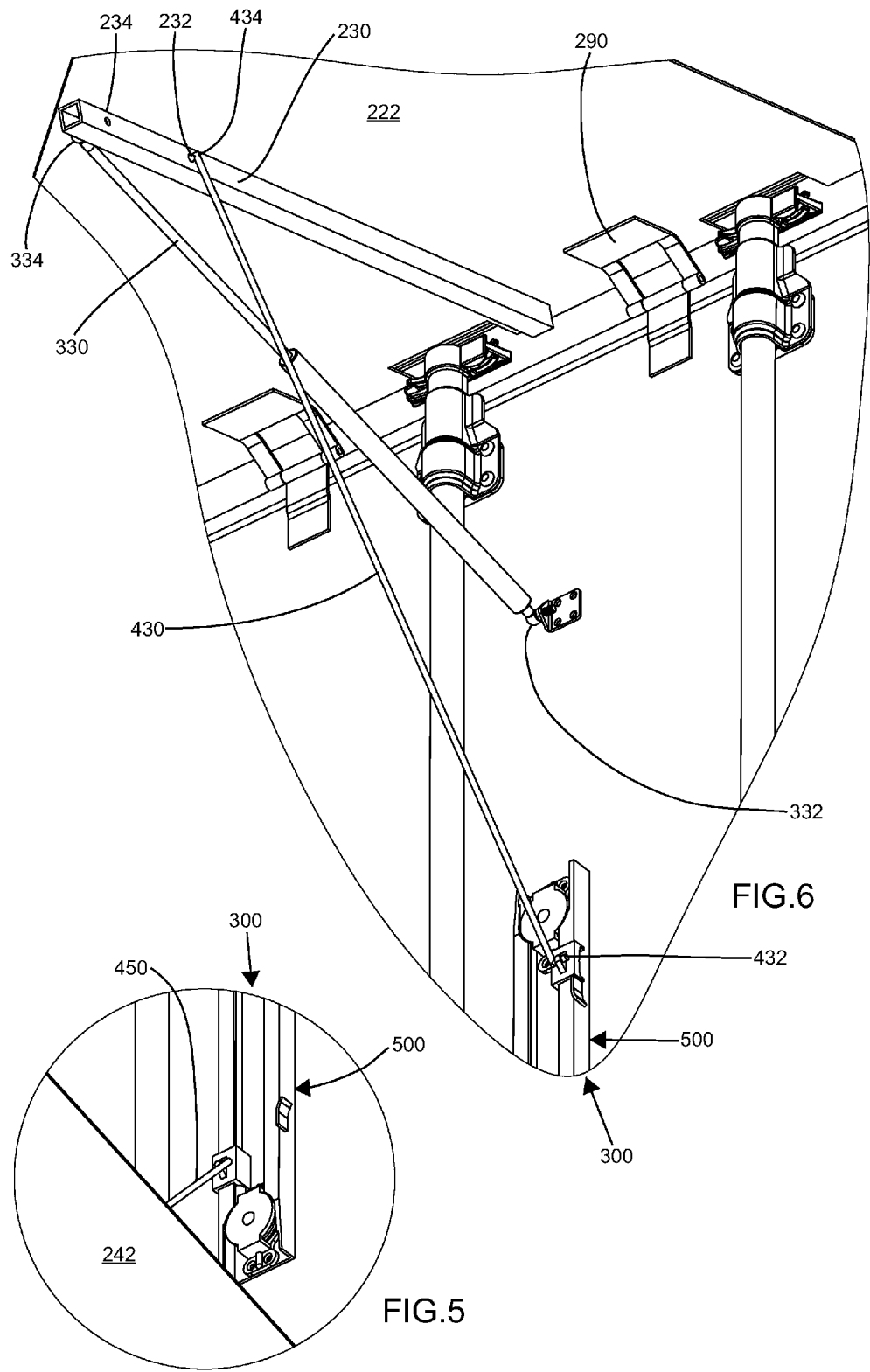

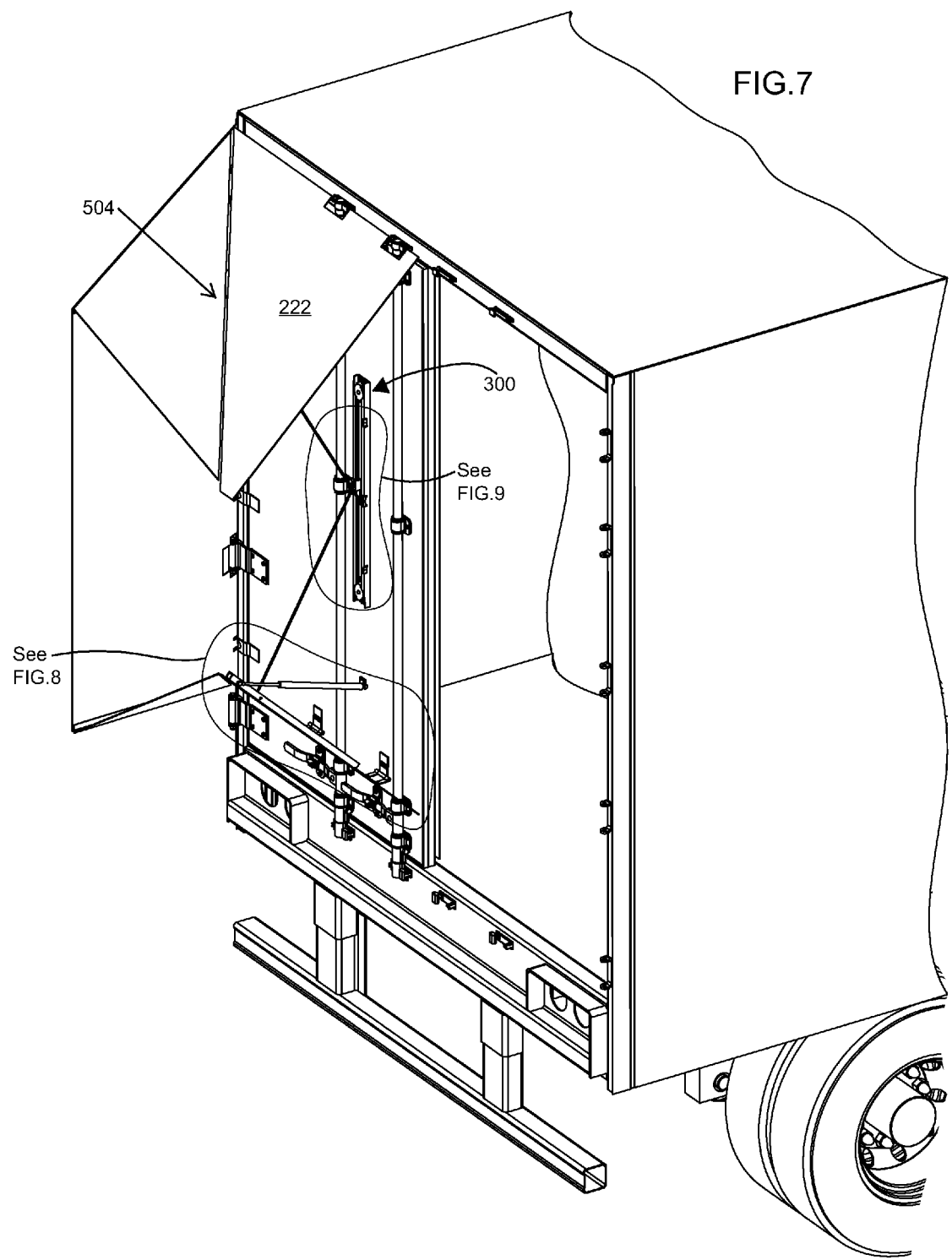

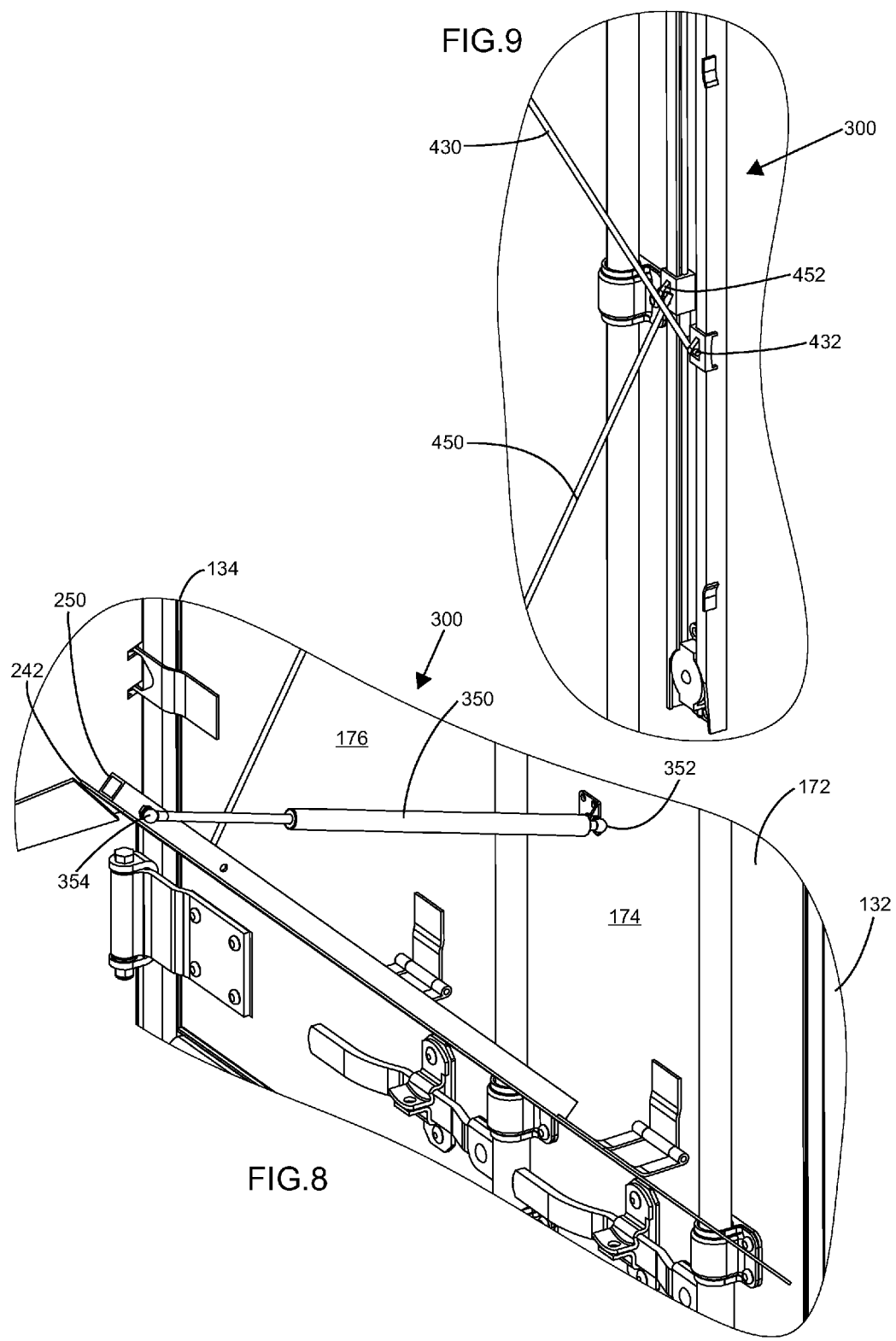

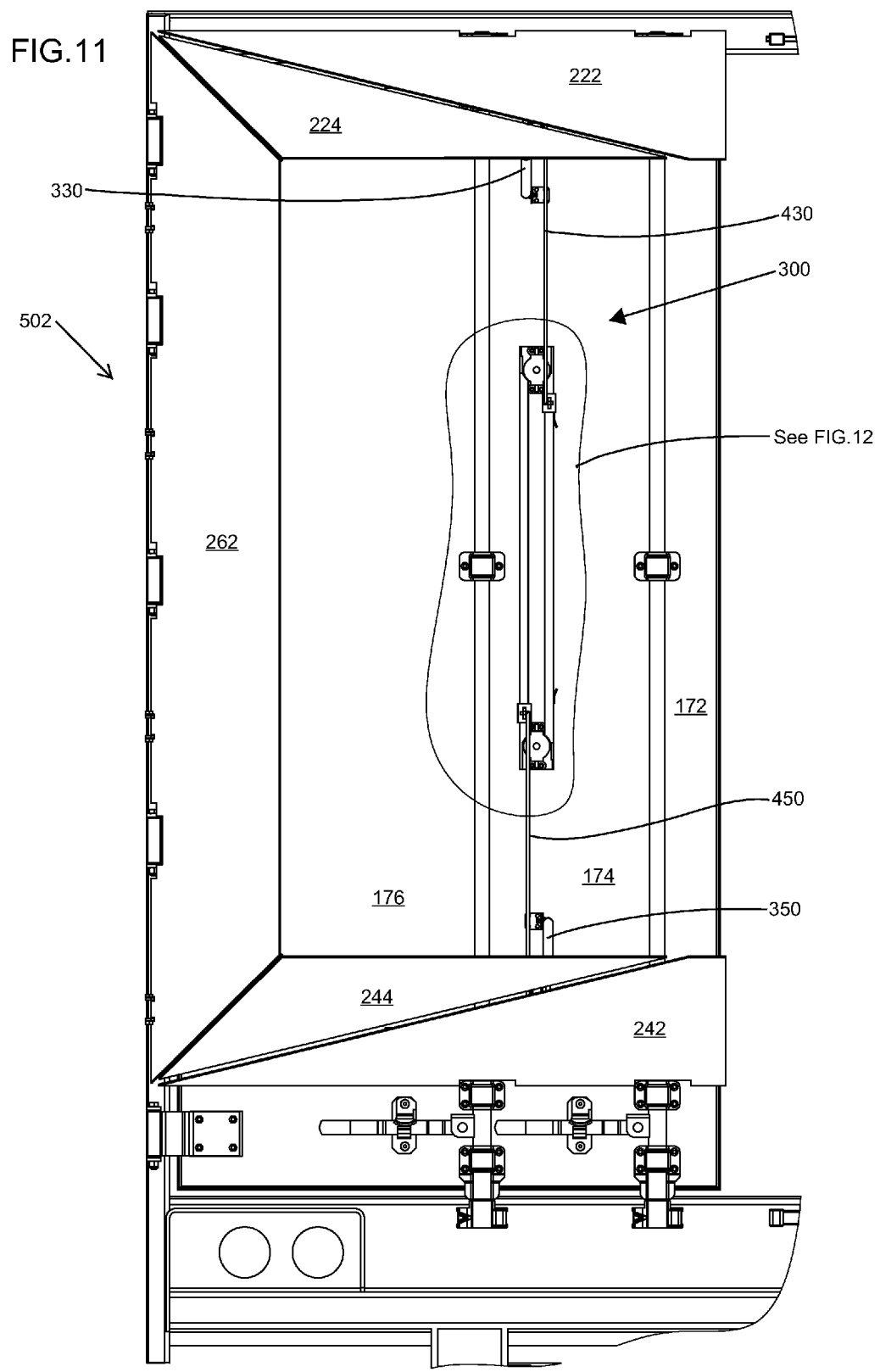

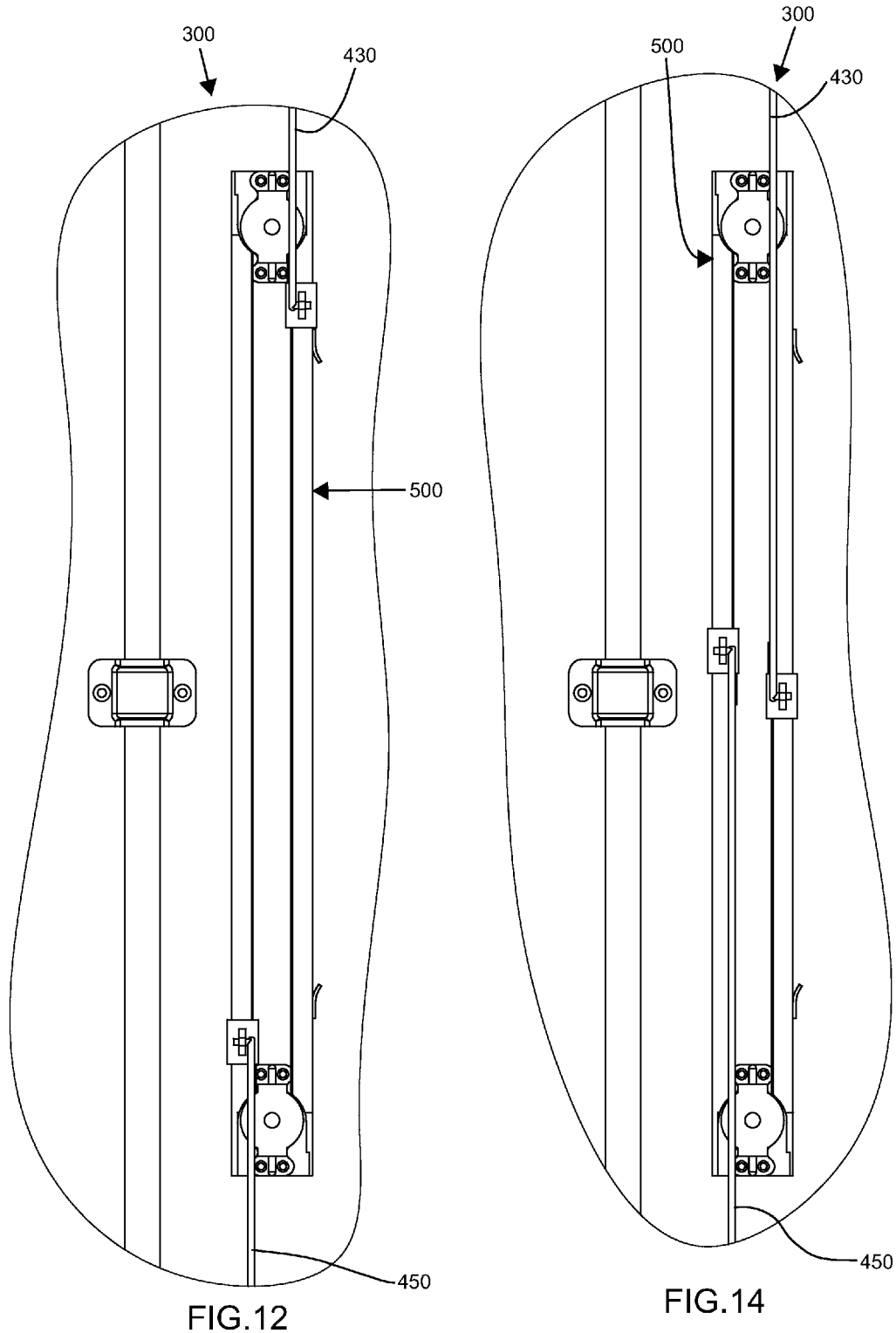

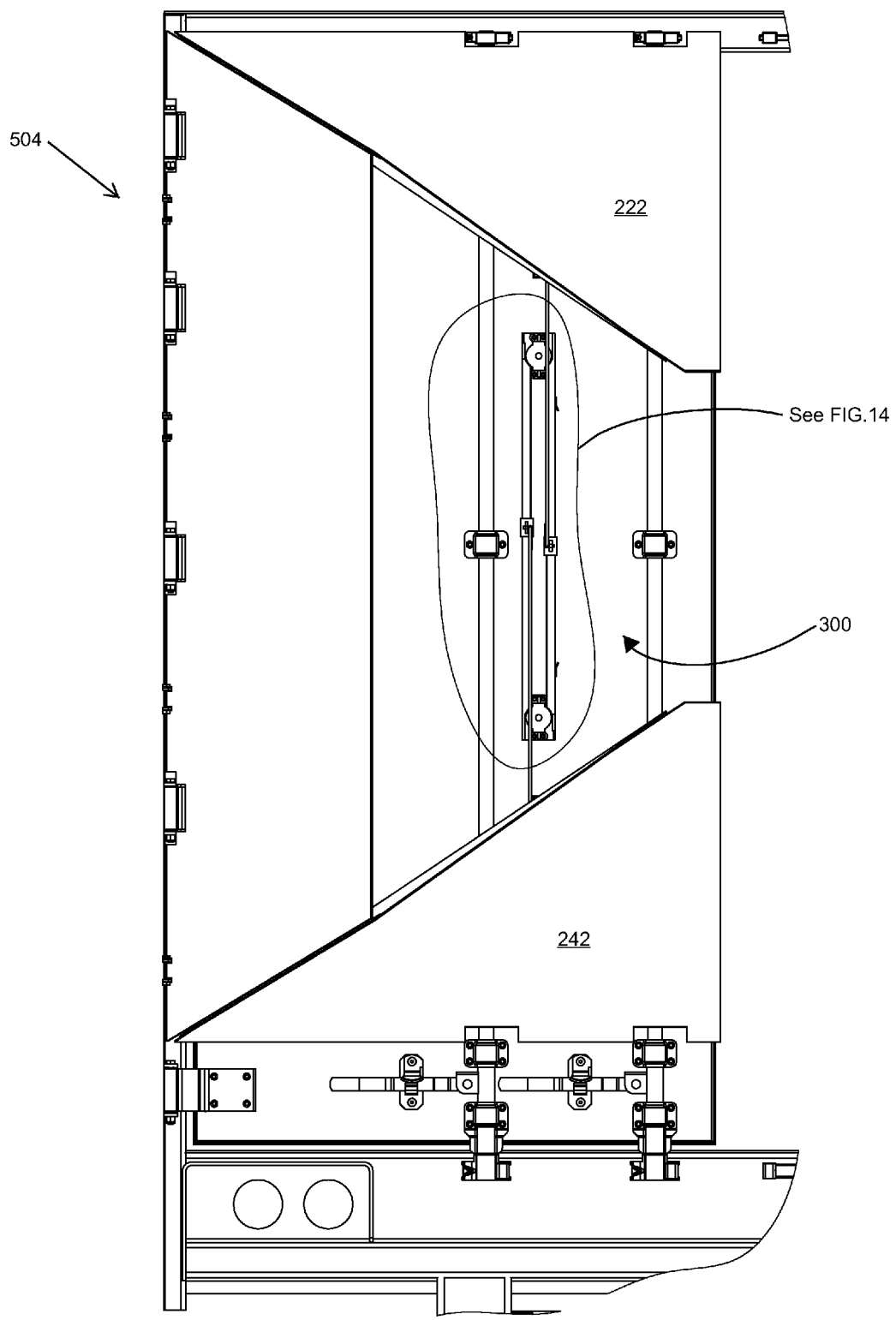

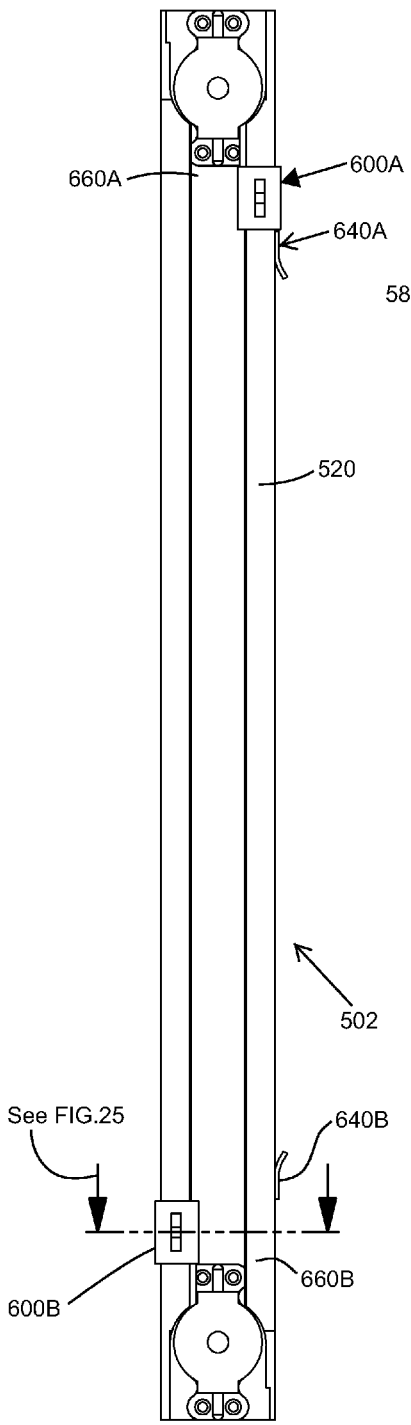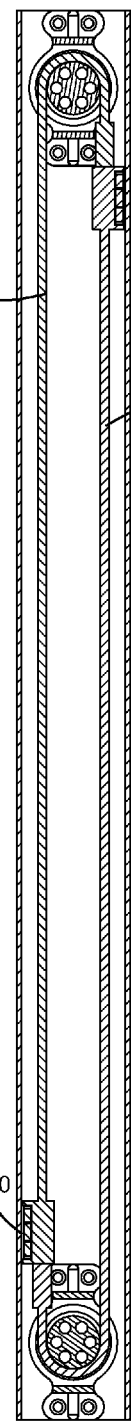

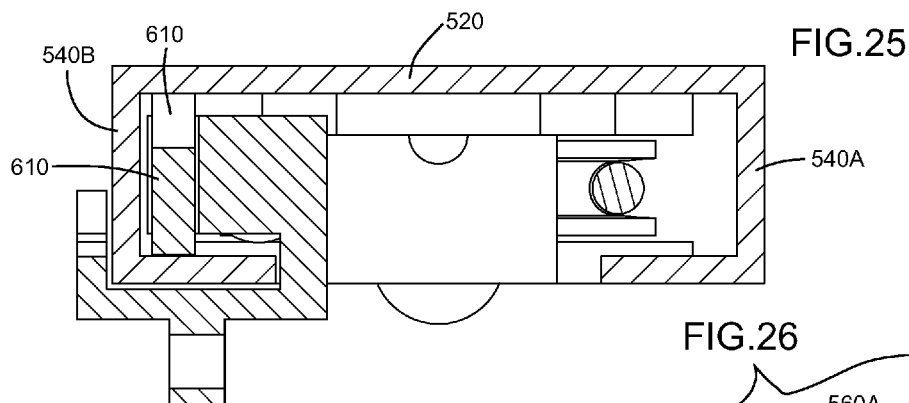
FIG.25
FIG.26
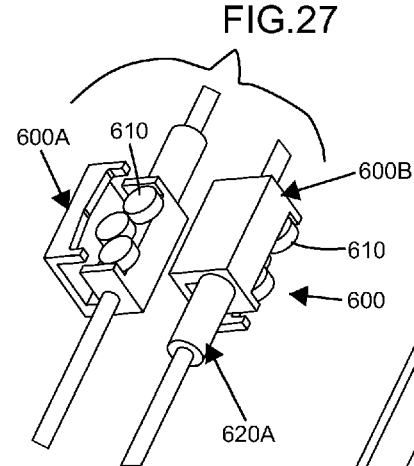
FIG.27
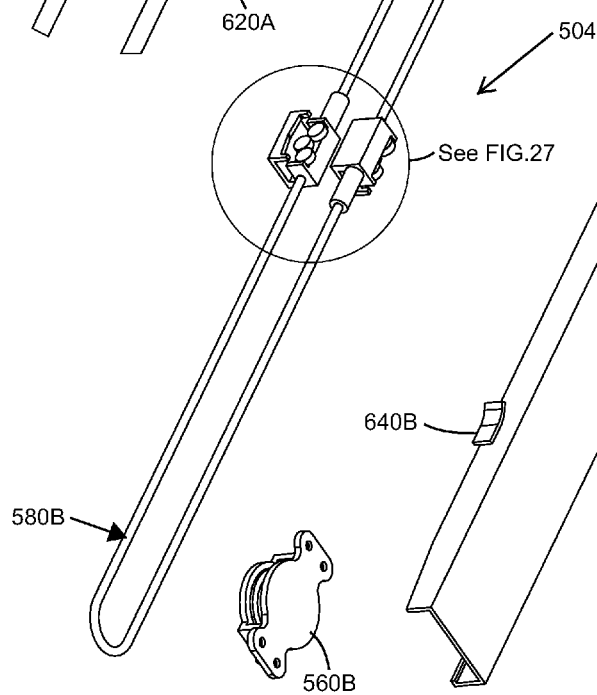

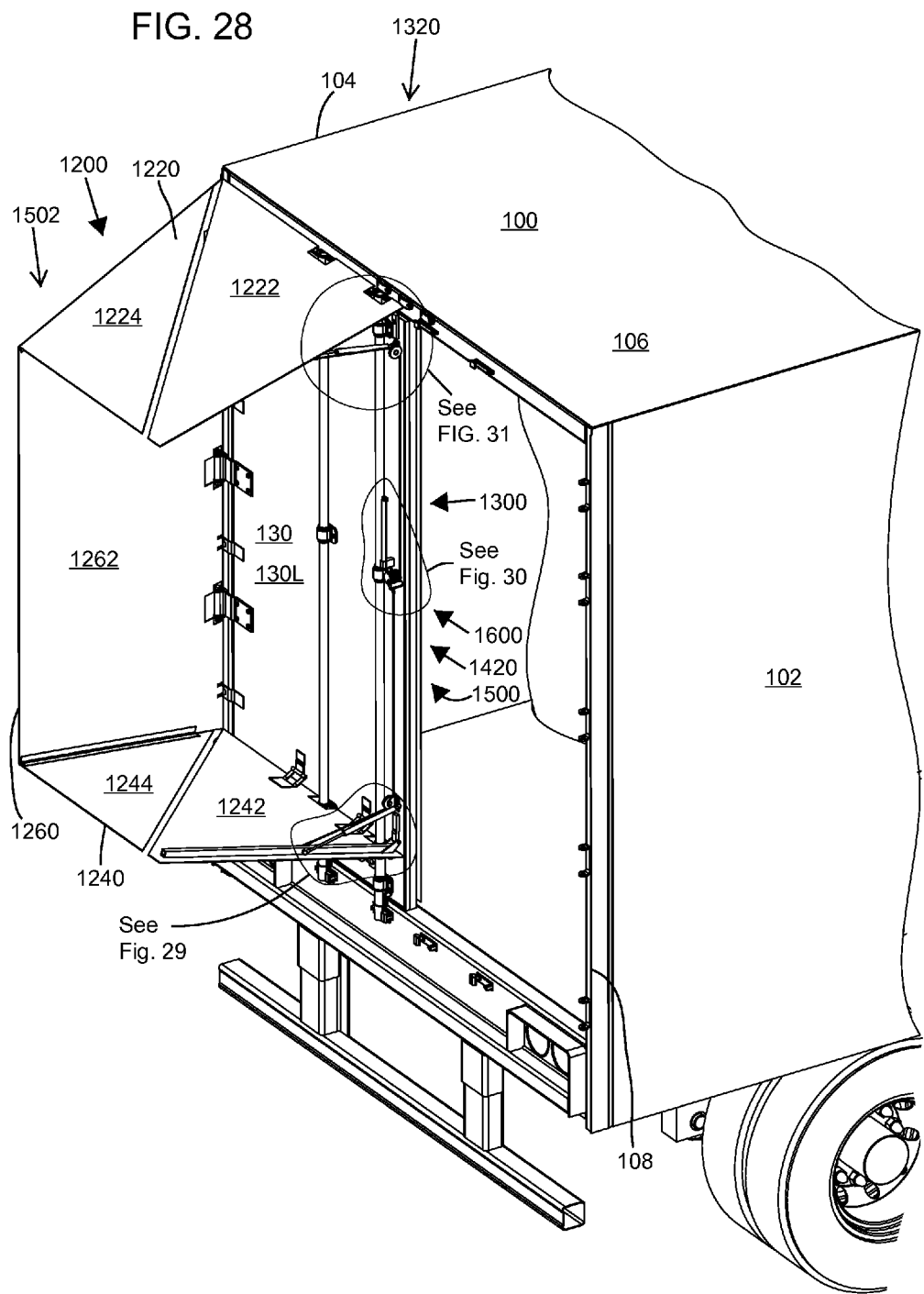

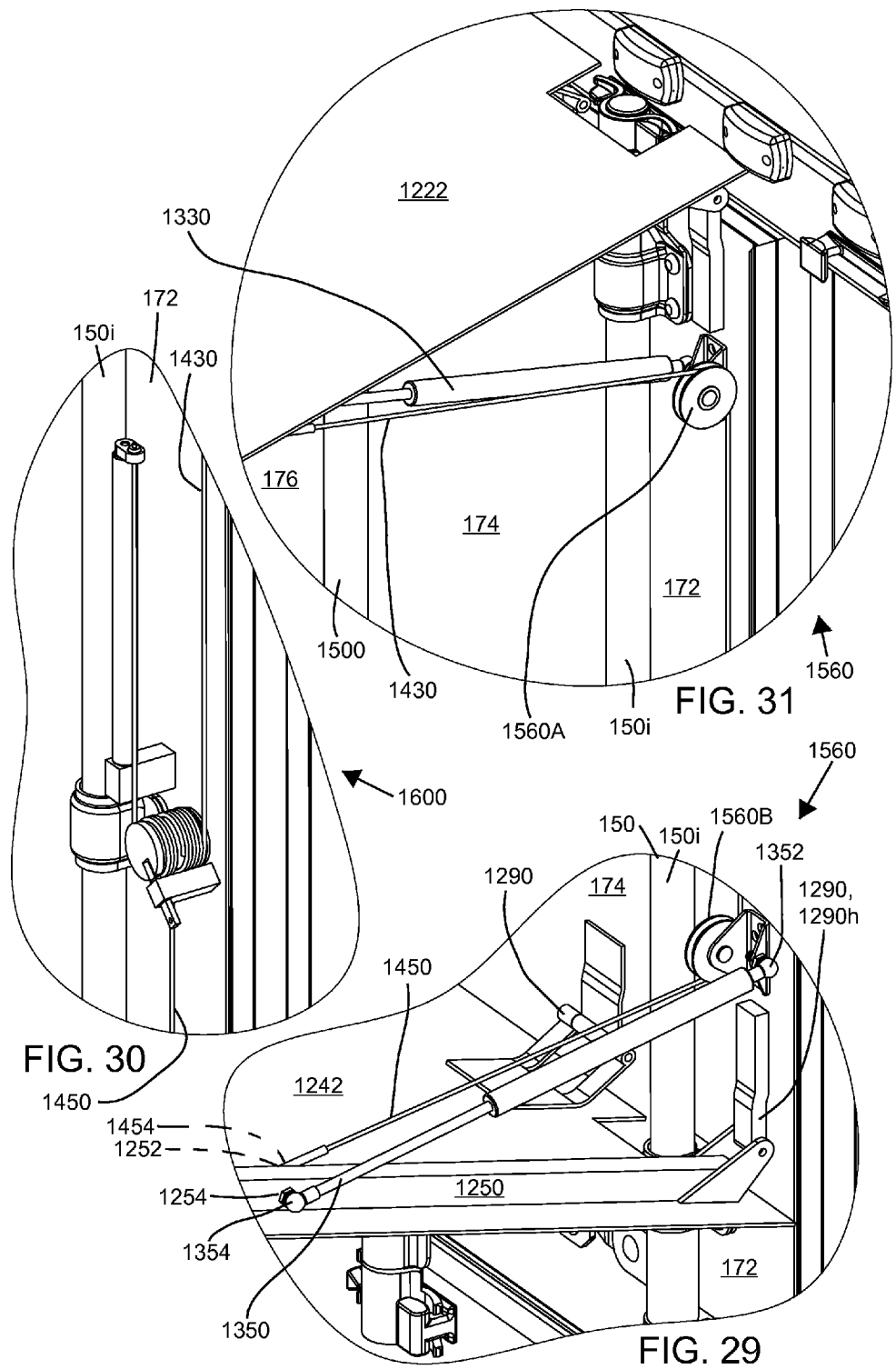

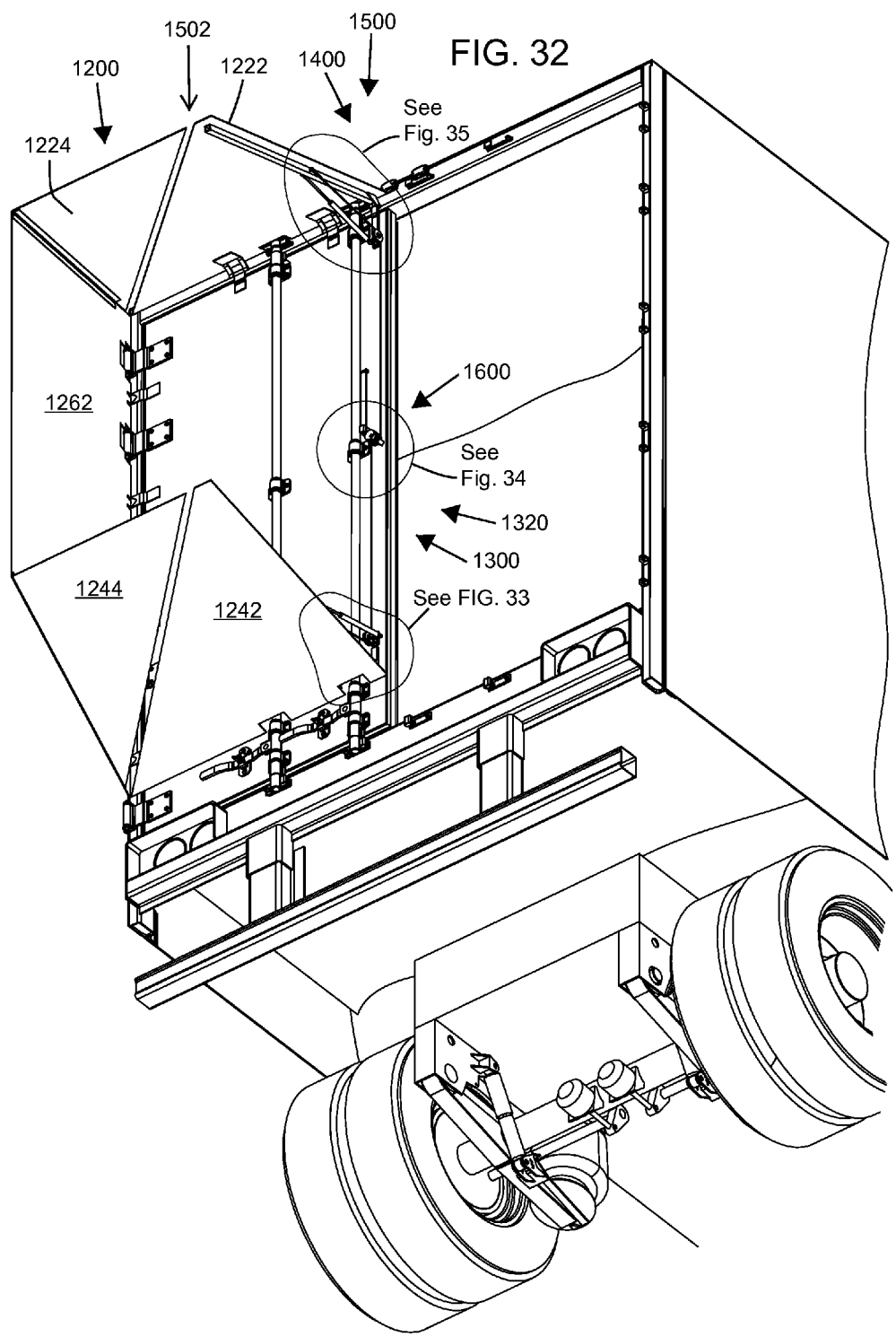

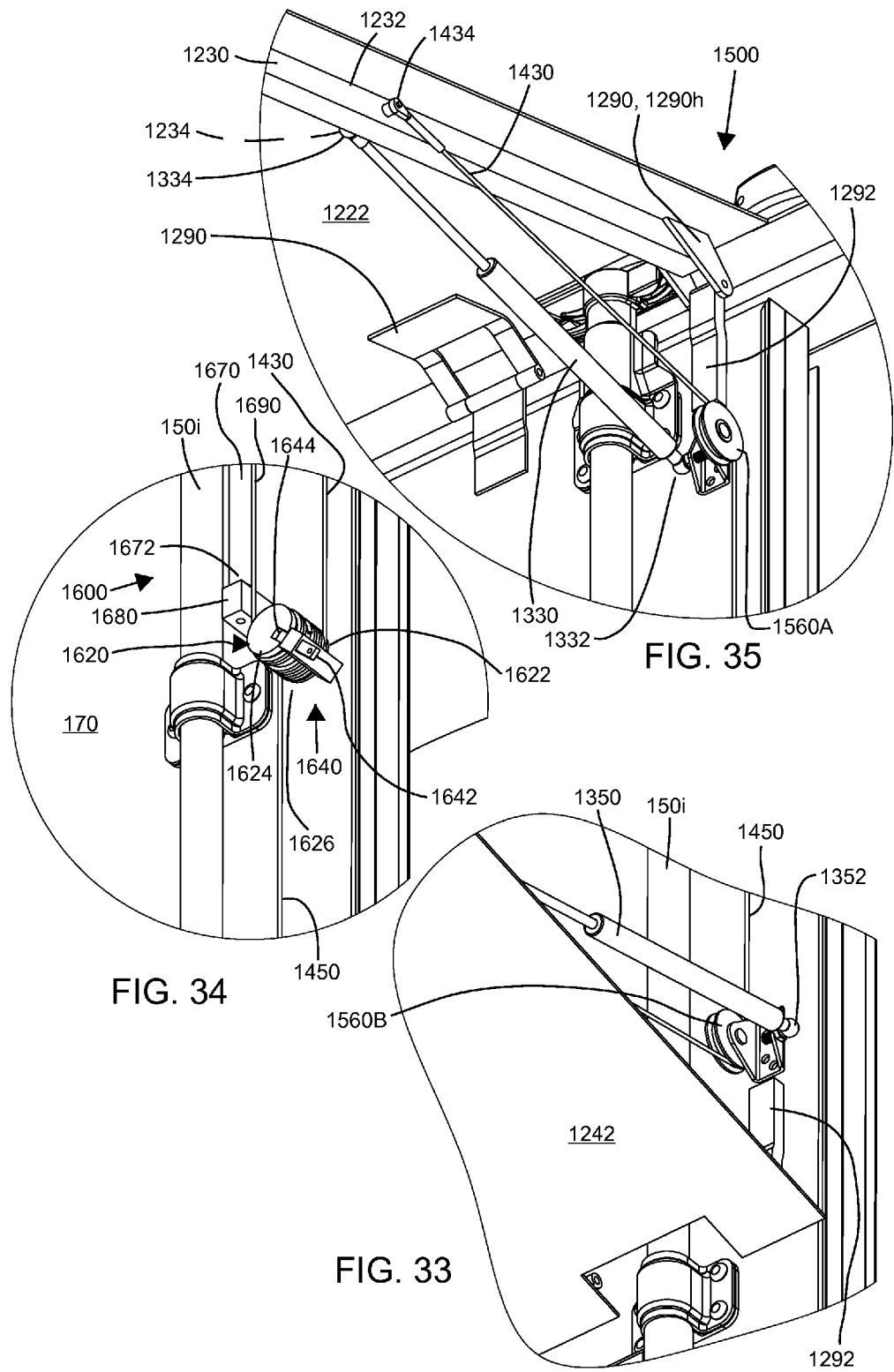

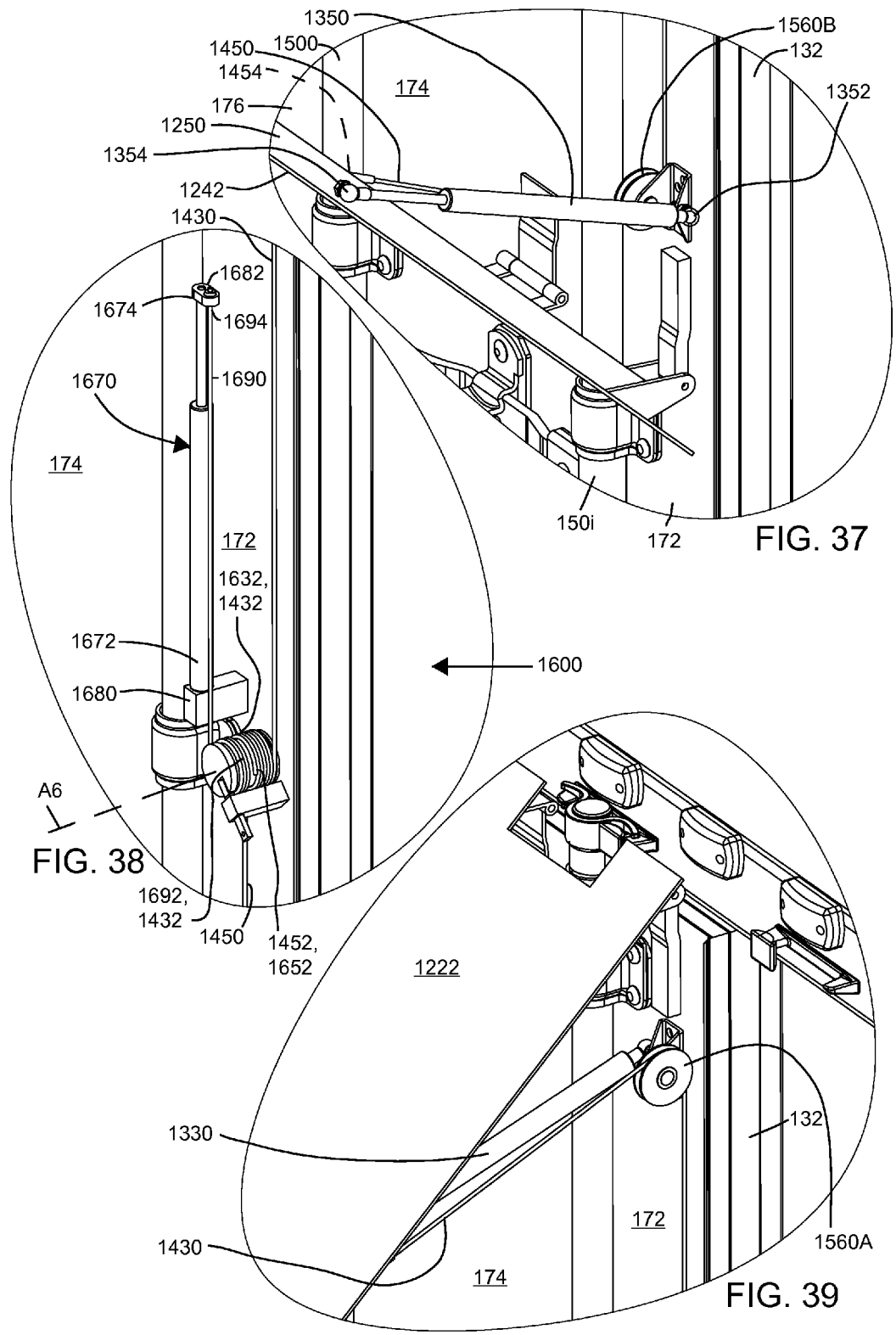

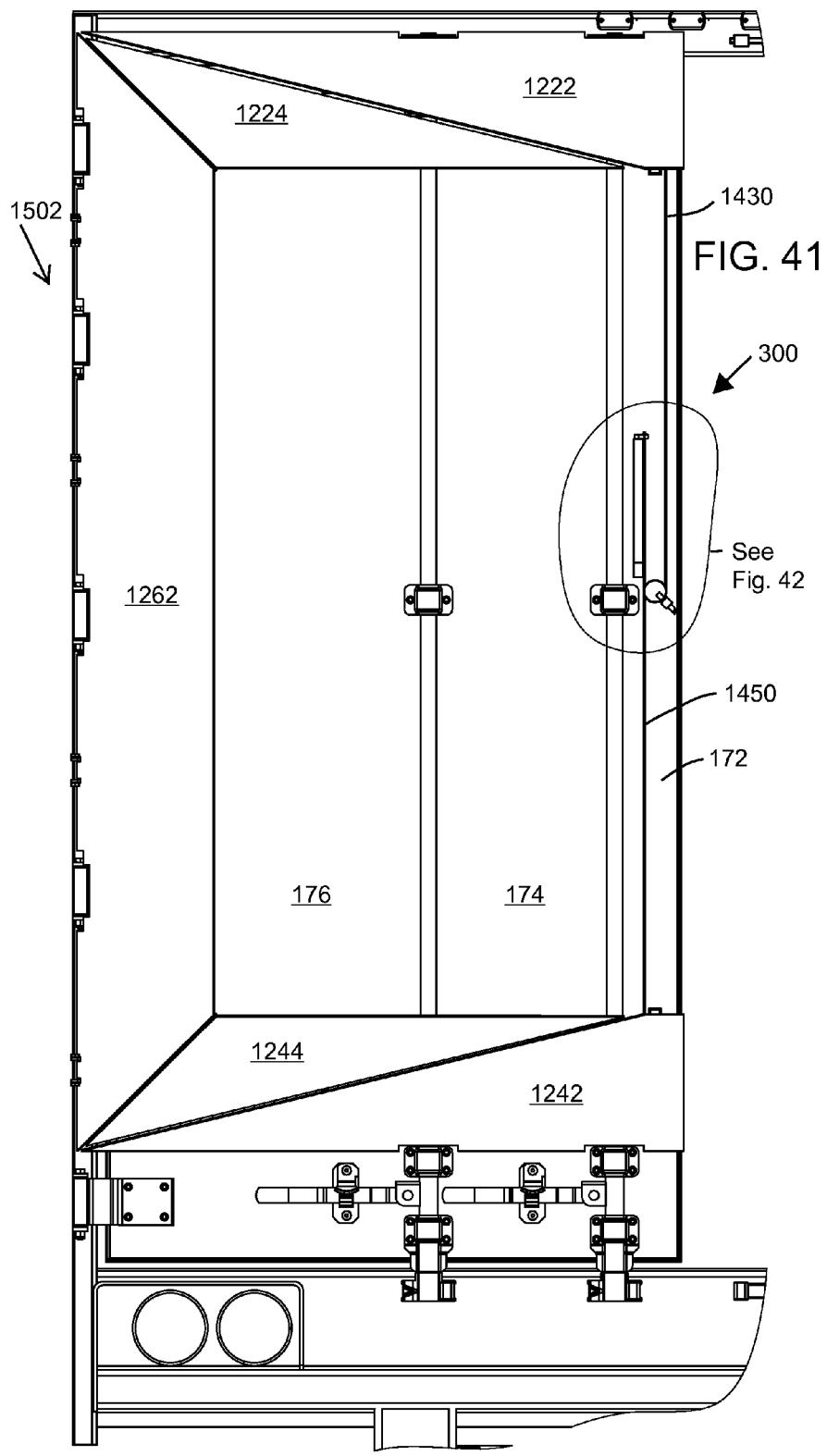

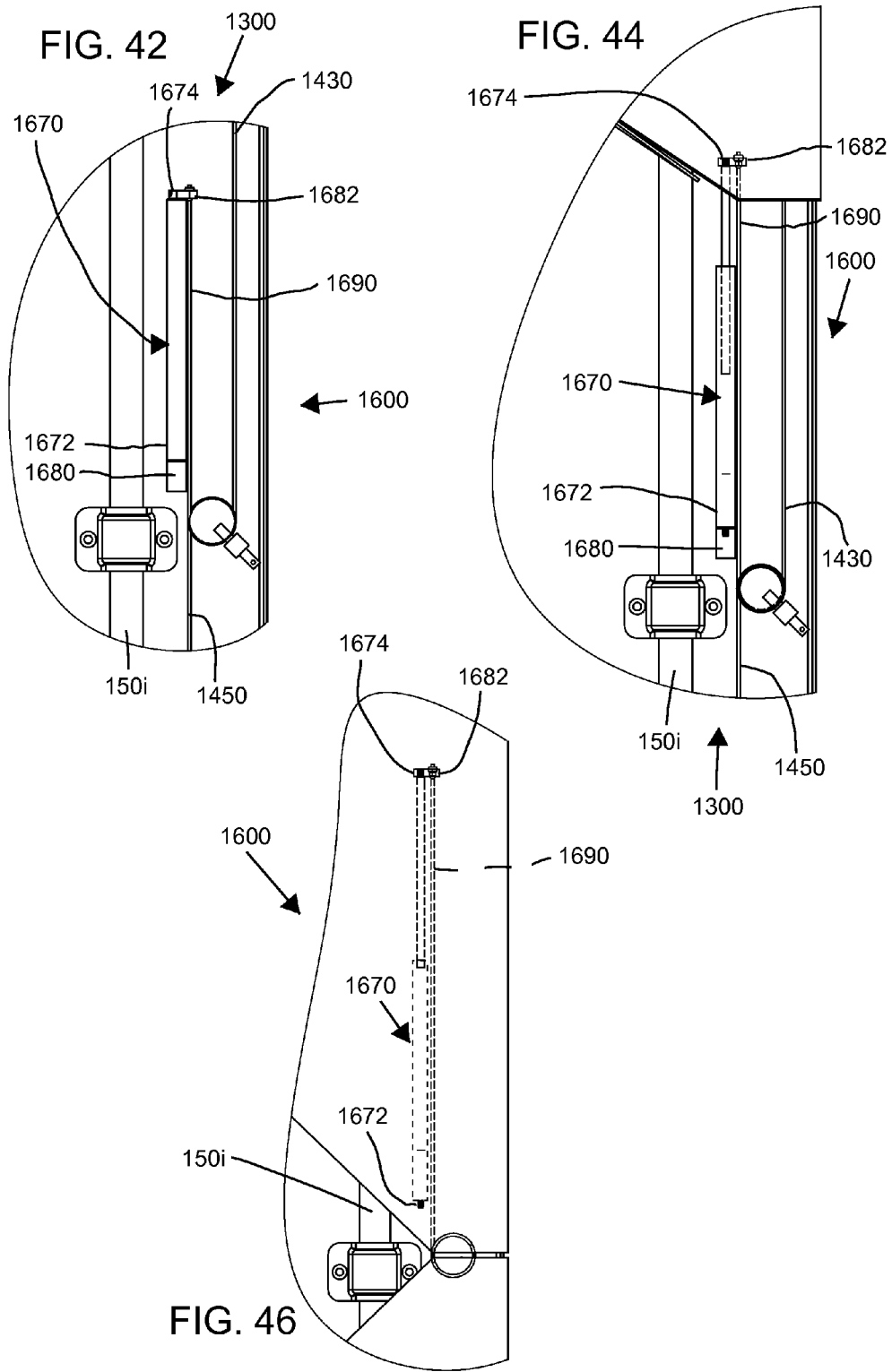

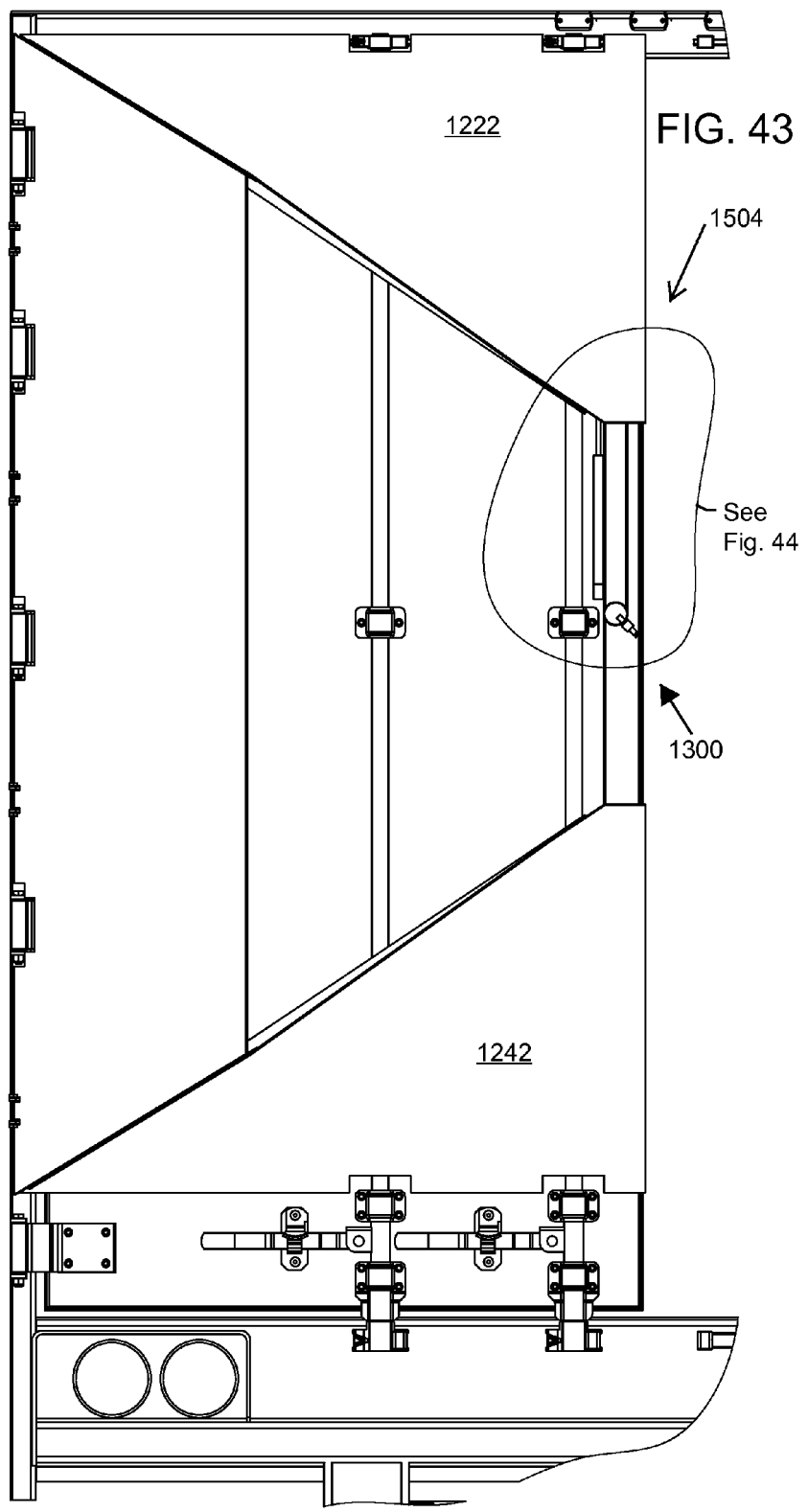

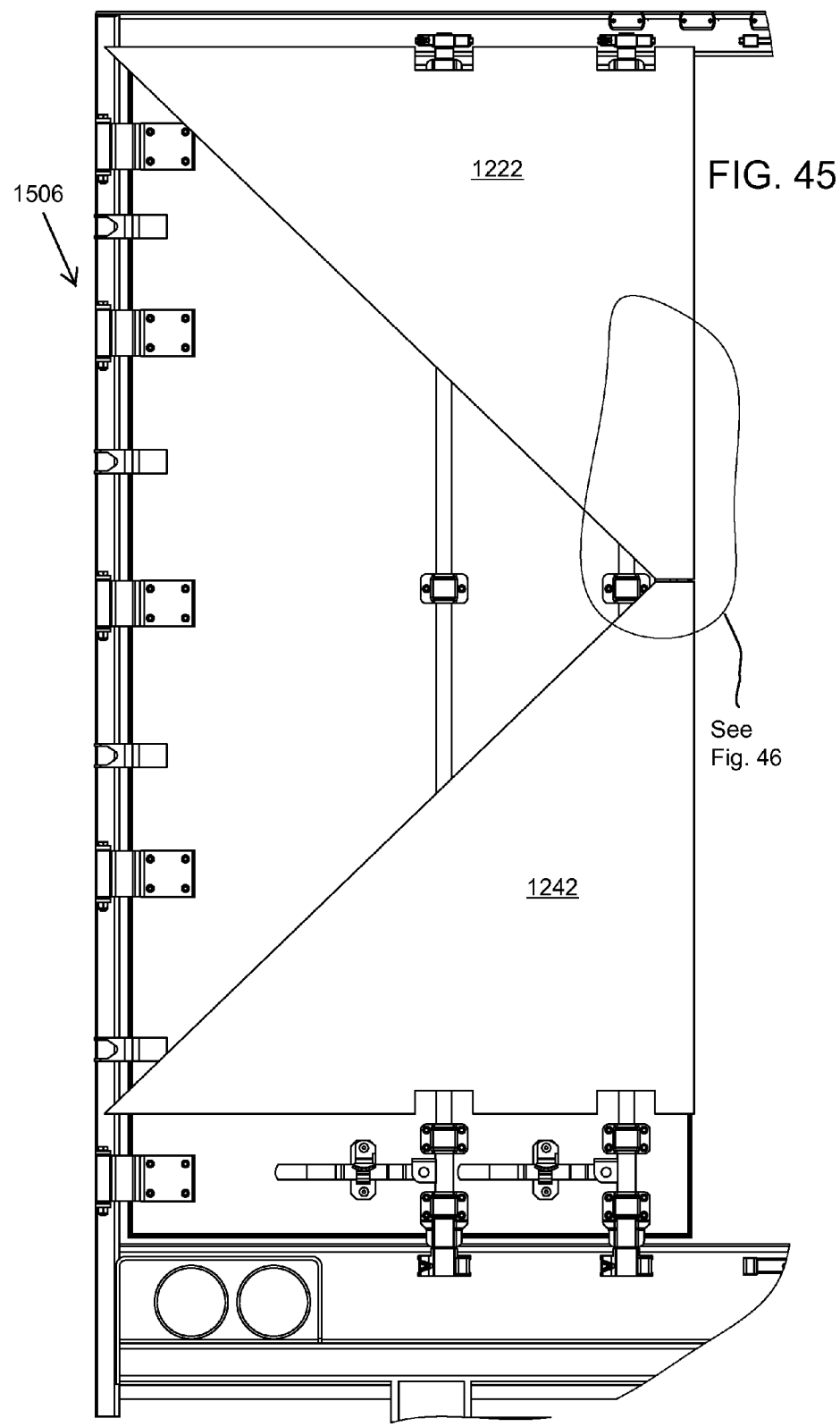

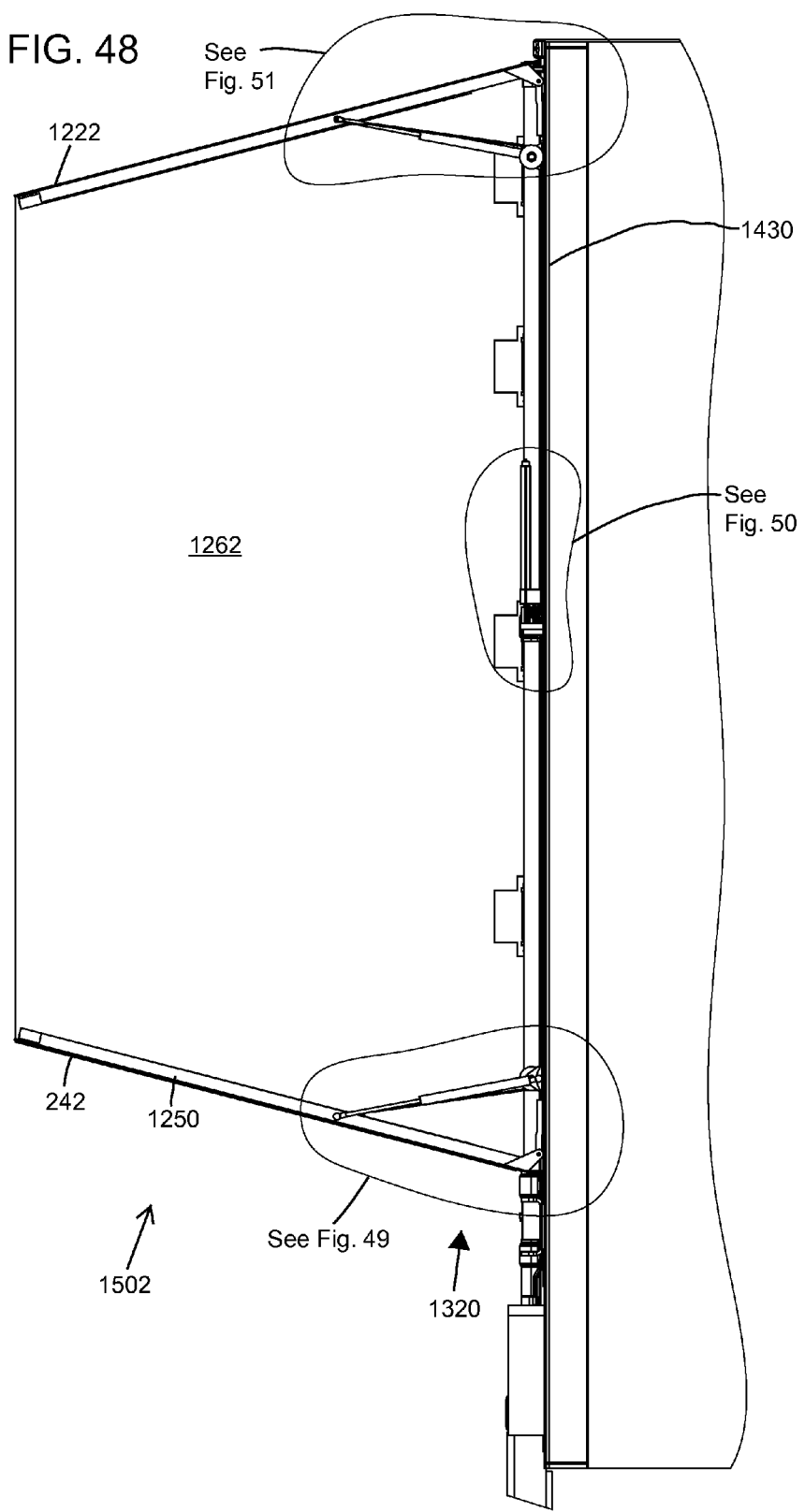

AERODYNAMIC DRAG REDUCING APPARATUS

CROSS REFERENCE TO RELATED APPLICATION

The present application claims the benefit of U.S. Provisional Patent Application Ser. No. 61/892,636, entitled Aerodynamic Drag Reducing Apparatus, and filed on Oct. 18, 2013, the disclosure of which is hereby incorporated by reference in its entirety.

BACKGROUND

It is known that a significant amount of aerodynamic drag is created when a vehicle travels at velocities typical on a modern roadway. This, in large part, is due to areas of low pressure that act on rear surfaces of the vehicle. The low pressure becomes more pronounced as airflow over the vehicle separates from surfaces of the vehicle. The phenomenon of airflow separation is also well known in aircraft wing design and, in this case, causes the aircraft wing to stall.

Vehicles with blunt rear ends are especially affected by airflow separation starting at an abrupt transition to the near vertical rear end surfaces. The low pressure that the airflow separation causes is compounded by a relatively large area that the low pressure acts over compared with more streamlined vehicles.

The low pressure acting on the rear surfaces of the vehicle as it moves produces a force that resists forward motion of the vehicle. The force is opposed by the vehicle's engine and requires power that is typically produced by burning fuel. Any reduction in aerodynamic drag results in a reduction in fuel consumption.

In a period of high fuel prices, increasing fuel efficiency is a growing concern. Aerodynamic improvements are especially valuable since they can be combined with other improvements such as engine efficiency, reduced chassis weight, etc. Increasing the fuel efficiency also provides a valuable benefit of increasing a range that a given vehicle can travel between refueling stops.

SUMMARY

One aspect of the present disclosure relates to an aerodynamic drag reducing apparatus adapted for mounting behind a vehicle. The aerodynamic drag reducing apparatus includes a linear actuator (e.g., a gas spring actuator, a spring actuator, a hydraulic cylinder, a pneumatic cylinder, etc.) that may reside adjacent one, two, or more lock-rods of a door and/or between a lock-rod and an inboard edge of the door. The linear actuator is adapted to deploy and retract aerodynamic panels and/or frames of an aerodynamic assembly. The linear actuator may be refracted by a tension member (e.g., a cable, a rope, a chain, a wire, etc.).

Another aspect of the present disclosure relates to a plurality of the linear actuators that are coordinated by a tension member arrangement with one or more tension member. When stowing the aerodynamic drag reducing apparatus, the tension member arrangement may coordinate the plurality of the linear actuators. The plurality of coordinated linear actuators may produce extension loads that urge the aerodynamic panels and/or frames of the aerodynamic assembly toward a deployed configuration. Tension within the tension member arrangement may overcome the extension loads and thereby facilitate the stowing of the aerodynamic drag reducing apparatus. The tension member arrangement may include a first attachment that corresponds to a first actuator of the plurality of the linear actuators and a second attachment that corresponds to a second actuator of the plurality of the linear actuators.

Still another aspect of the present disclosure relates to moving a first panel of the aerodynamic assembly toward the stowed configuration and thereby producing tension in the tension member arrangement via movement of the first attachment and thereby also producing compression in the first actuator. The tension in the tension member arrangement urges retraction of the second actuator via the second attachment. The retraction of the second actuator facilitates movement of a second panel of the aerodynamic assembly toward the stowed configuration.

Yet another aspect of the present disclosure relates to routing the tension member arrangement with spools and/or pulleys.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views, unless otherwise specified.

FIG. 2 is an enlarged portion of FIG. 1;

FIG. 3 is an enlarged portion of FIG. 1;

FIG. 4 is another partial perspective view of the vehicle and the aerodynamic drag reducing apparatus of FIG. 1, the aerodynamic drag reducing apparatus illustrated in the deployed configuration;

FIG. 5 is an enlarged portion of FIG. 4;

FIG. 6 is an enlarged portion of FIG. 4;

FIG. 7 is the partial perspective view of FIG. 1, but with the aerodynamic drag reducing apparatus illustrated in an intermediate configuration;

FIG. 8 is an enlarged portion of FIG. 7;

FIG. 9 is an enlarged portion of FIG. 7;

FIG. 11 is a partial rear elevation view of the aerodynamic drag reducing apparatus and the vehicle of FIG. 1, with the aerodynamic drag reducing apparatus illustrated in the deployed configuration;

FIG. 12 is an enlarged portion of FIG. 11;

FIG. 13 is the partial rear elevation view of FIG. 11, but with the aerodynamic drag reducing apparatus illustrated in the intermediate configuration;

FIG. 14 is an enlarged portion of FIG. 13;

FIG. 22 is a right side elevation view of the pulley arrangement of FIG. 20, the pulley arrangement illustrated in the deployed configuration;

FIG. 23 is a rear cross-sectional elevation view of the pulley arrangement of FIG. 20, as called out at FIG. 22;

FIG. 24 is a rear elevation view of the pulley arrangement of FIG. 20, the pulley arrangement illustrated in the deployed configuration;

FIG. 25 is an enlarged top cross-sectional plan view of the pulley arrangement of FIG. 20, as called out at FIG. 24;

FIG. 26 is another exploded perspective view of the pulley arrangement of FIG. 20, the pulley arrangement illustrated in the intermediate configuration;

FIG. 27 is an enlarged portion of FIG. 26;

FIG. 28 is a partial perspective view of a vehicle with an aerodynamic drag reducing apparatus mounted on a rear end of the vehicle, the aerodynamic drag reducing apparatus illustrated in a deployed configuration, according to the principles of the present disclosure;

FIG. 29 is an enlarged portion of FIG. 28;

FIG. 30 is an enlarged portion of FIG. 28;

FIG. 31 is an enlarged portion of FIG. 28;

FIG. 32 is another partial perspective view of the vehicle and the aerodynamic drag reducing apparatus of FIG. 28, the aerodynamic drag reducing apparatus illustrated in the deployed configuration;

FIG. 33 is an enlarged portion of FIG. 32;

FIG. 34 is an enlarged portion of FIG. 32;

FIG. 35 is an enlarged portion of FIG. 32;

FIG. 37 is an enlarged portion of FIG. 36;

FIG. 38 is an enlarged portion of FIG. 36;

FIG. 39 is an enlarged portion of FIG. 36;

FIG. 41 is a partial rear elevation view of the aerodynamic drag reducing apparatus and the vehicle of FIG. 28, with the aerodynamic drag reducing apparatus illustrated in the deployed configuration;

FIG. 42 is an enlarged portion of FIG. 41;

FIG. 43 is the partial rear elevation view of FIG. 41, but with the aerodynamic drag reducing apparatus illustrated in the intermediate configuration;

FIG. 44 is an enlarged portion of FIG. 43, with certain hidden lines shown;

FIG. 45 is the partial rear elevation view of FIG. 43, but with the aerodynamic drag reducing apparatus illustrated in the stowed configuration, and with the certain panels of the aerodynamic drag reducing apparatus removed;

FIG. 46 is an enlarged portion of FIG. 45, with certain hidden lines shown;

FIG. 48 is the partial right side elevation view of FIG. 47, but with an inner lock-rod of a left rear door and certain right hinge pieces of the vehicle removed;

DETAILED DESCRIPTION

Figure 1:
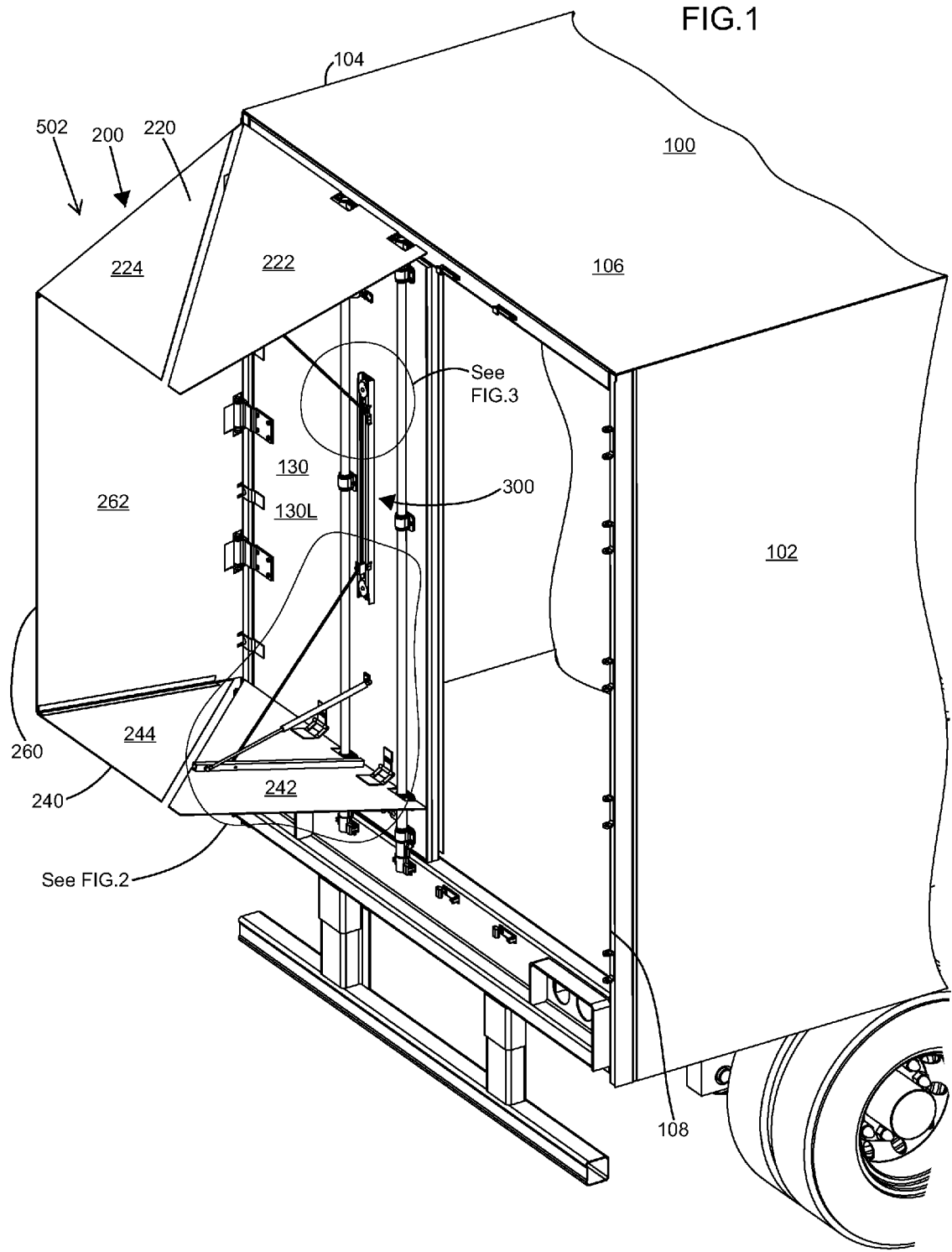
FIG. 1 is a partial perspective view of a vehicle with an aerodynamic drag reducing apparatus mounted on a rear end of the vehicle, the aerodynamic drag reducing apparatus illustrated in a deployed configuration, according to the principles of the present disclosure.
Figure 10:
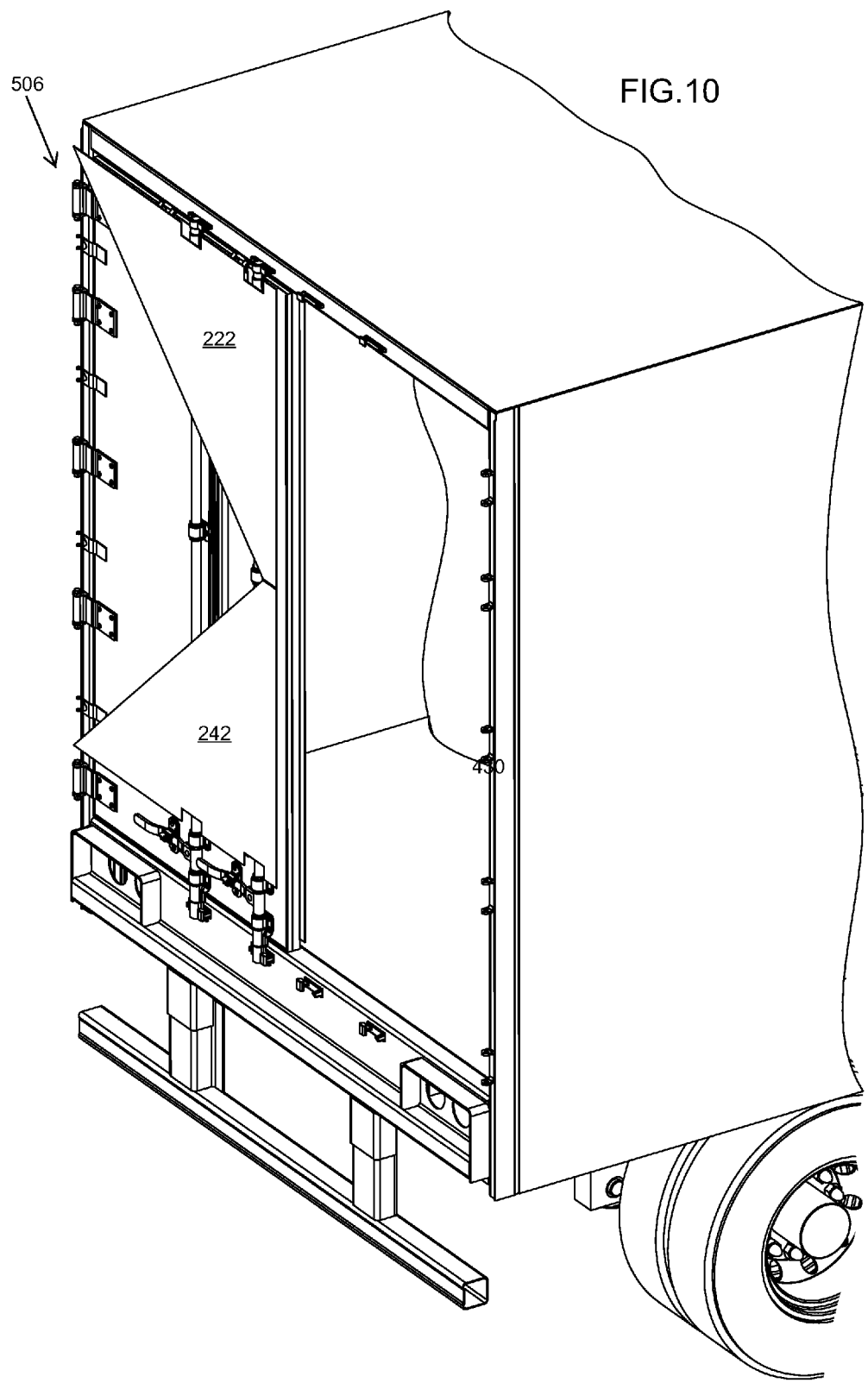
FIG. 10 is the partial perspective view of FIG. 1, but with the aerodynamic drag reducing apparatus illustrated in a stowed configuration, and with certain panels of the aerodynamic drag reducing apparatus removed.
Figure 15:
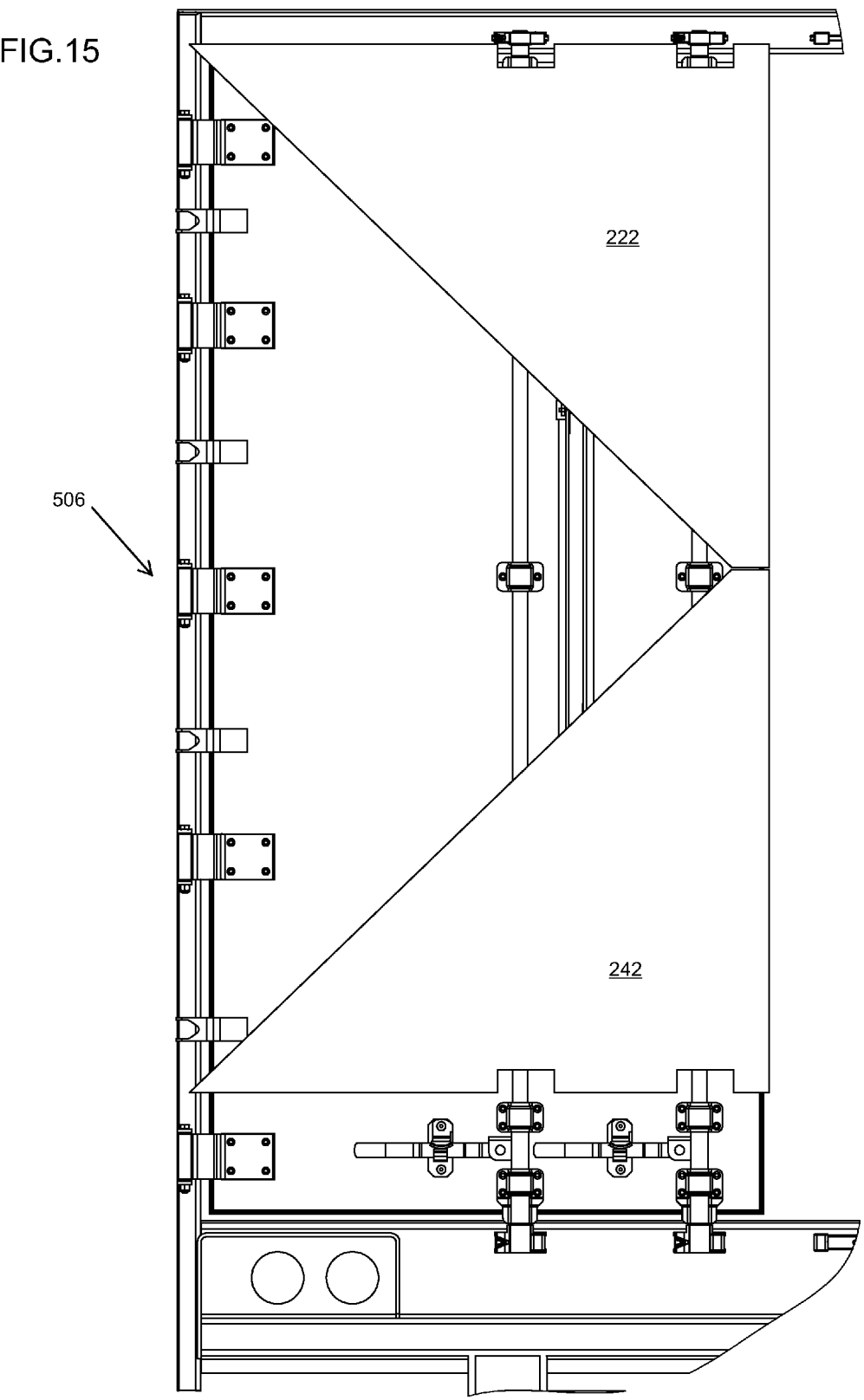
FIG. 15 is the partial rear elevation view of FIG. 13, but with the aerodynamic drag reducing apparatus illustrated in the stowed configuration, and with the certain panels of the aerodynamic drag reducing apparatus removed.
Figure 16:
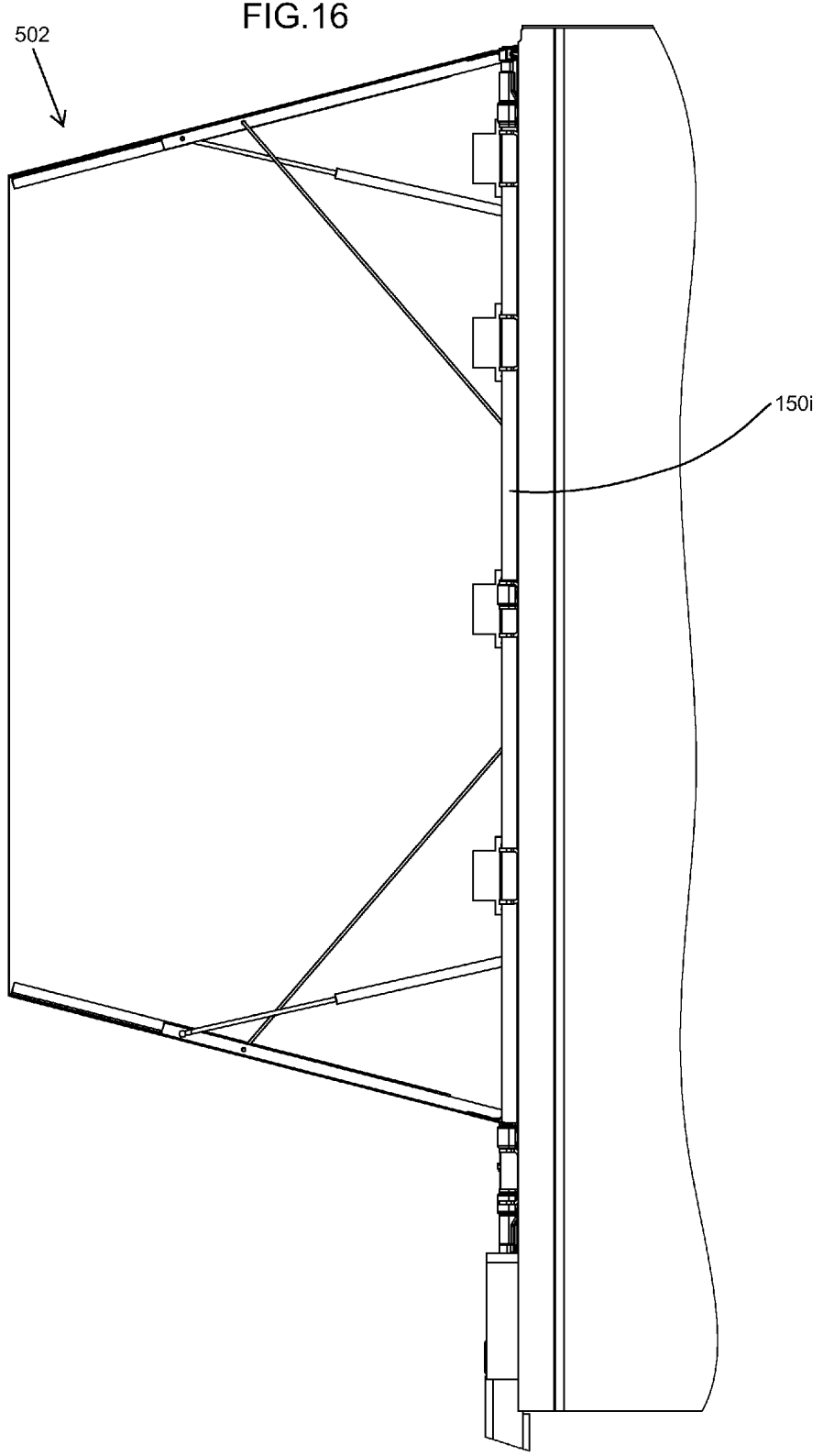
FIG. 16 is a partial right side elevation view of the aerodynamic drag reducing apparatus of FIG. 1, the aerodynamic drag reducing apparatus illustrated in the deployed configuration.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This application relates to U.S. Provisional Patent Applications Ser. 61/836,660, filed on 18 Jun. 2013, Ser. 61/843,261, filed on 5 Jul. 2013, and Ser. 61/858,598, filed on 25 Jul. 2013, and to U.S. Pat. Nos. 7,374,230; 7,618,086; 7,850,224; 8,272,680; and 8,480,162, which are all hereby incorporated by reference in their entireties. This application further relates to U. S. patent application Ser. No. 14/308,707, filed on 7 Oct. 2014 and also hereby incorporated by reference in its entirety.

The present disclosure generally relates to rear mounted aerodynamic devices for use with vehicles. In certain embodiments, the vehicles have a generally vertical rear end. The generally vertical rear end typical results in air flow separation and thereby produces aerodynamic drag, especially when the vehicle is traveling at highway speeds.

Turning now to FIGS. 1-10, an example vehicle 100 is illustrated with an example aerodynamic assembly 200. As depicted, the aerodynamic assembly 200 is adapted to mount to doors 130 of the vehicle 100. As depicted, the aerodynamic assembly 200 is mounted to a left door 130L of the vehicle 100. Not shown is a mirrored aerodynamic assembly and a right door of the vehicle 100 to which the mirrored aerodynamic assembly may be mounted. The mirrored aerodynamic assembly may be substantially a mirror image of the aerodynamic assembly 200. The aerodynamic assembly 200 may be similar to various aerodynamic assemblies and/or aerodynamic arrangements illustrated and described in the U.S. Patent Applications and/or the U.S. Patents incorporated by reference above. The aerodynamic assembly 200 and the mirrored aerodynamic assembly are adapted for mounting on a rear end 108 of the vehicle 100. The vehicle 100 may be an over-the-road truck, an over-the-road trailer, and/or various other vehicles. As illustrated at FIG. 1, the vehicle 100 generally extends between a first side 102 and a second side 104. The vehicle 100 generally defines a top 106. The aerodynamic assembly 200 and the mirrored aerodynamic assembly generally extend between the first side 102 and the second side 104 of the vehicle 100. The aerodynamic assembly 200 and the mirrored aerodynamic assembly are generally adjacent to the top 106 of the vehicle 100.

The doors 130 of the vehicle 100 generally extend between an inboard edge 132 and an outboard edge 134 (see FIG. 8). The doors 130 are generally mounted adjacent the outboard edge 134 to the vehicle 100. The doors 130 include the left hand door 130L and the right hand door (not shown). The doors 130 generally cover the rear end 108 of the vehicle 100 when in a closed configuration. The doors 130 may be opened against the first side 102 and the second side 104 of the vehicle 100, respectively. The doors 130 may include one or more lock-rods 150. As depicted, the lock-rods 150 include an inboard lock-rod 150i and an outboard lock-rod 150o. The doors 130 may define a rear surface 170. The rear surface 170 may be divided into various areas by the lock-rods 150. As depicted, an inboard area 172 of the rear surface 170 is defined between the inboard edge 132 of the door 130 and the inboard lock-rod 150i. As depicted, a between-the-lock-rods area 174 is defined between the inboard lock-rod 150i and the outboard lock-rod 150o. As depicted, an outboard area 176 is defined between the outboard lock-rod 150o and the outboard edge 134 of the door 130.

As illustrated, the aerodynamic assembly 200 includes a top panel arrangement 220, a bottom panel arrangement 240, and a side panel arrangement 260 (see FIG. 1). As depicted, the top panel arrangement 220 includes a first panel 222 hingedly connected to a second panel 224. Likewise, the bottom panel arrangement 240 may include a first panel 242 hingedly connected to a second panel 244. As depicted, the top panel arrangement 220 and the bottom panel arrangement 240 may substantially be mirror images of each other. In other embodiments, the top panel arrangement 220 and the bottom panel arrangement 240 are similar but different from each other. As depicted, the first panel 222 and the first panel 242 are hingely mounted to the door 130 of the vehicle 100 by hinges 290 (see FIG. 2). The hinges 290 on each of the respective panels 222, 242 allow the panels 222, 242 to fold inwardly together and outwardly away from each other. The first panel 222 may include a frame 230 or other similar structure (see FIG. 6). The frame 230 may include a first attachment point 232 and a second attachment point 234. In certain embodiments, the attachment points 232 and 234 may be a single attachment point. Likewise, the first panel 242 may include a frame 250 (see FIG. 2). The frame 250 may include a first attachment point 252 and a second attachment point 254. In certain embodiments, one or both of the frames 230, 250 may be directly attached to one of the hinges 290.

As illustrated, the side panel arrangement 260 of the aerodynamic assembly 200 and a side panel arrangement of the mirrored aerodynamic assembly may include a single side panel 262. In other embodiments, the side panel arrangement 260 may include multiple side panels that may be hingedly connected to each other. As depicted, the side panel 262 is hingely mounted to the door 130 of the vehicle 100 by hinges (see FIG. 2). In other embodiments, the side panel 262 is hingely mounted to the vehicle 100. In certain embodiments, the side panel 262 is hingely mounted to hinge pins of door hinges of the vehicle 100. In certain embodiments, the side panel 262 is hingely mounted along a common axis with the hinge pins of the door hinges of the vehicle 100. As depicted, the second panel 224 may be hingely connected to the side panel 262. As depicted, the second panel 244 may be hingely connected to the side panel 262.

The aerodynamic assembly 200 may be configured in a deployed configuration 502, an intermediate configuration 504, or a stowed configuration 506. The deployed configuration 502 generally configures the aerodynamic assembly 200 in a drag reducing configuration. The stowed configuration 506 generally configures the aerodynamic assembly 200 in a compact configuration and/or in a configuration that allows the doors 130 to be opened against the sides 102, 104 of the vehicle 100.

To facilitate movement of the panel 222 and/or the panel 242, an actuator arrangement 300 may be provided. The actuator arrangement 300 may include an actuator set 320, an actuator set 420, and a pulley set 500 (see FIGS. 12, 14, and 17). The actuator set 320 may include a first actuator 330 and a second actuator 350 (see FIG. 17). As depicted, the actuators 330, 350 may be gas springs. In certain embodiments, the actuators 330, 350 may be a fluid actuated cylinder (e.g., a pneumatic cylinder or a hydraulic cylinder). As depicted, the actuators 330, 350 may be biased to extend. In other embodiments, the actuators 330, 350 may be biased to retract. In other embodiments, the actuator 330 may be biased to extend and the actuator 350 may be biased to retract. In still other embodiments, the actuator 330 may be biased to retract and the actuator 350 may be biased to extend. The actuator 330 includes a first end 332 and a second end 334. As depicted, attachment points (e.g., spherical joints and/or cylindrical joints) may be included at the ends 332, 334. Likewise, the actuator 350 includes a first end 352 and a second end 354. Attachment points may be further included at the ends 352, 354.

Figure 17:
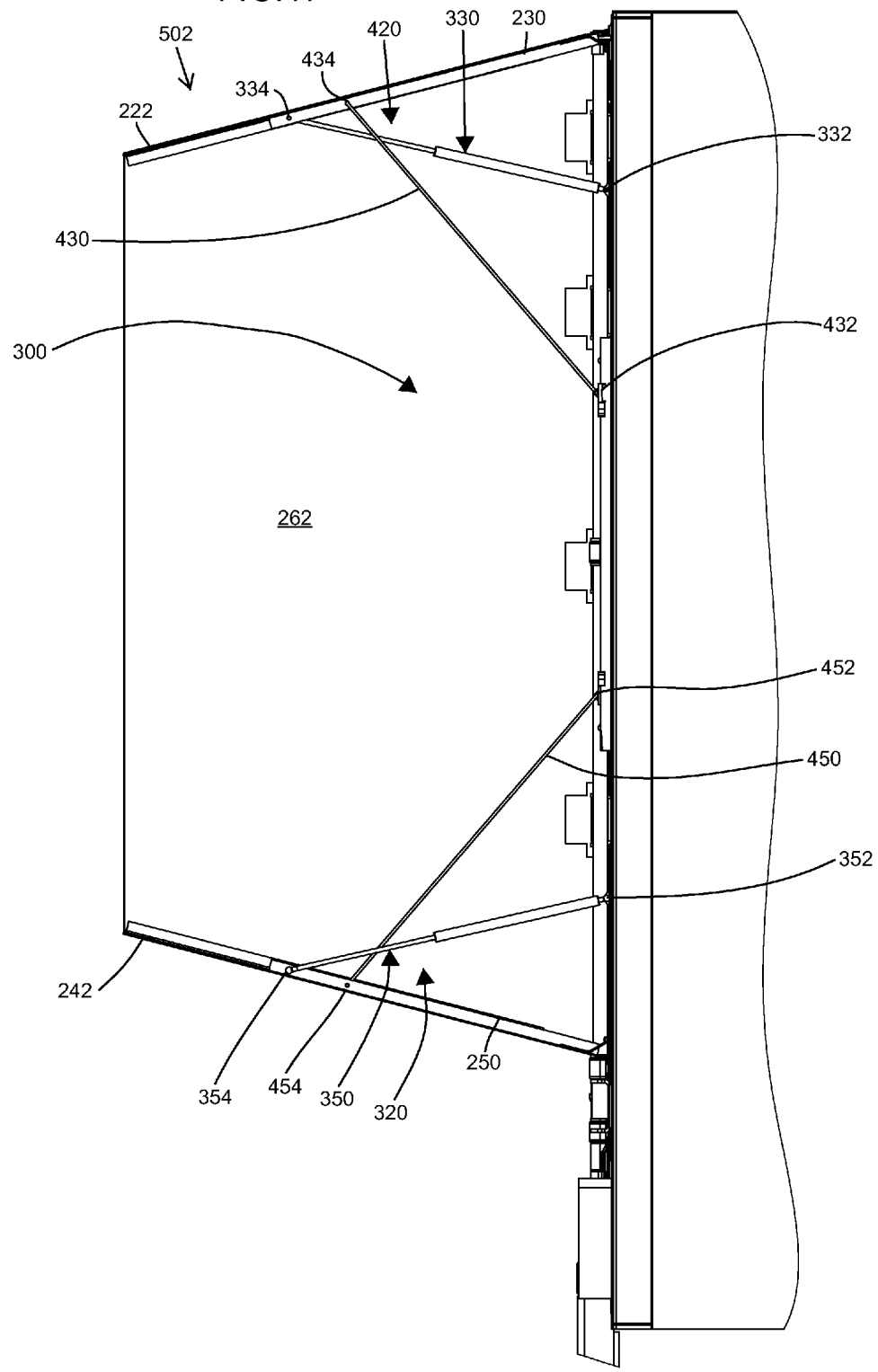
FIG. 17 is the partial right side elevation view of FIG. 16, but with an inner lock-rod of a left rear door and certain right hinge pieces of the vehicle removed.
Figure 18:
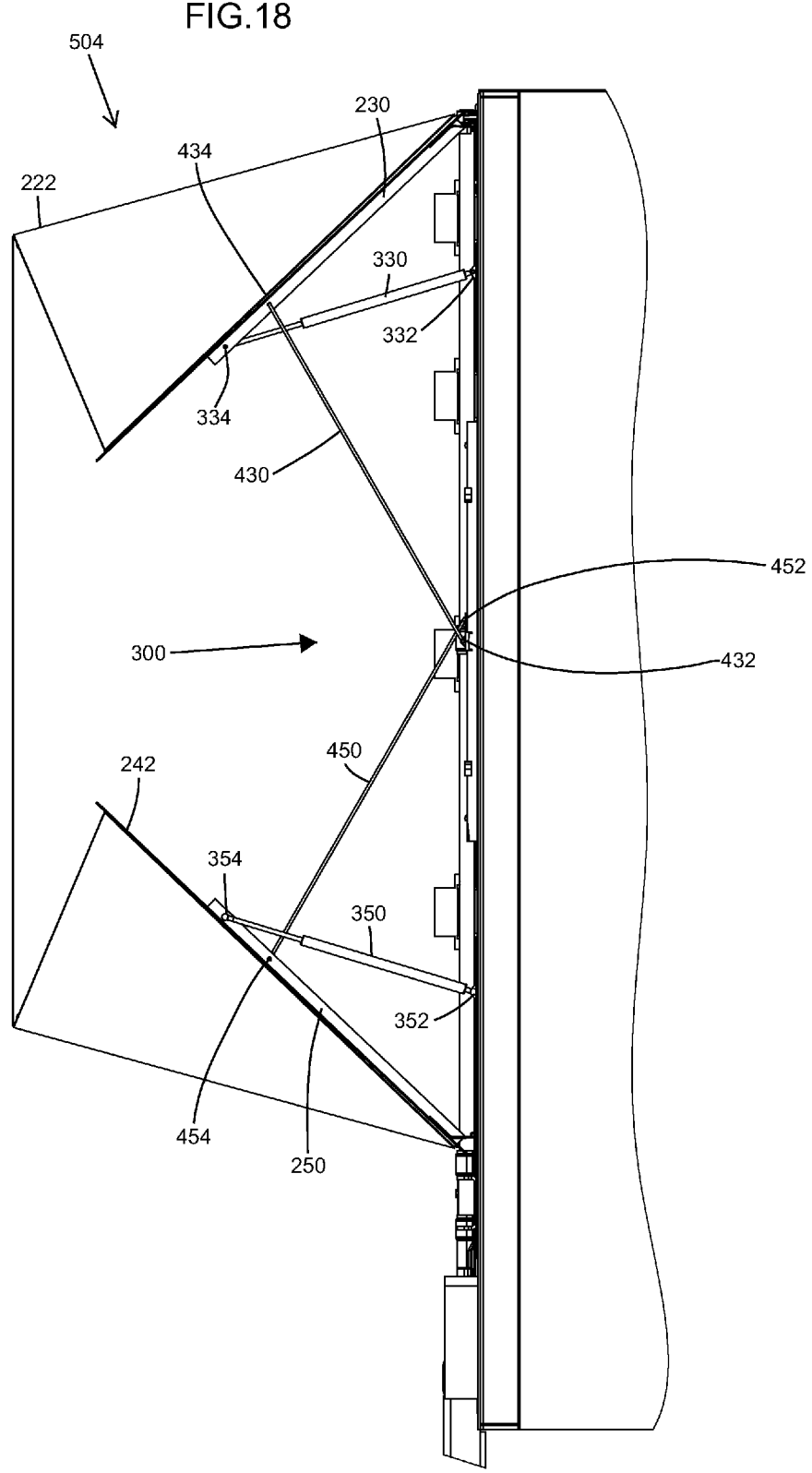
FIG. 18 is the partial right side elevation view of FIG. 17, but with the aerodynamic drag reducing apparatus illustrated in the intermediate configuration.
Figure 19:
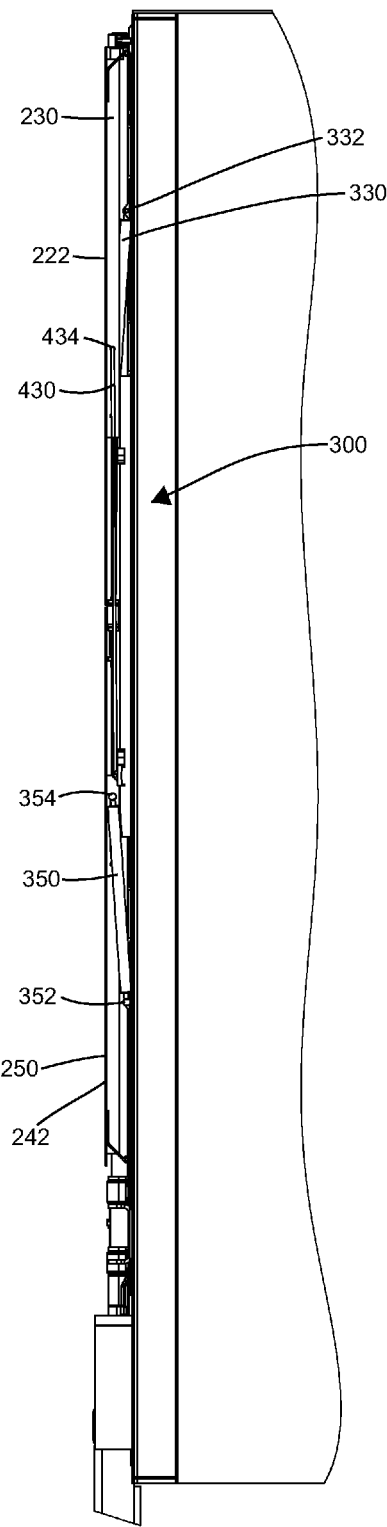
FIG. 19 is the partial right side elevation view of FIG. 17, but with the aerodynamic drag reducing apparatus illustrated in the stowed configuration, and with the certain panels of the aerodynamic drag reducing apparatus removed.
Figures 20, 21:
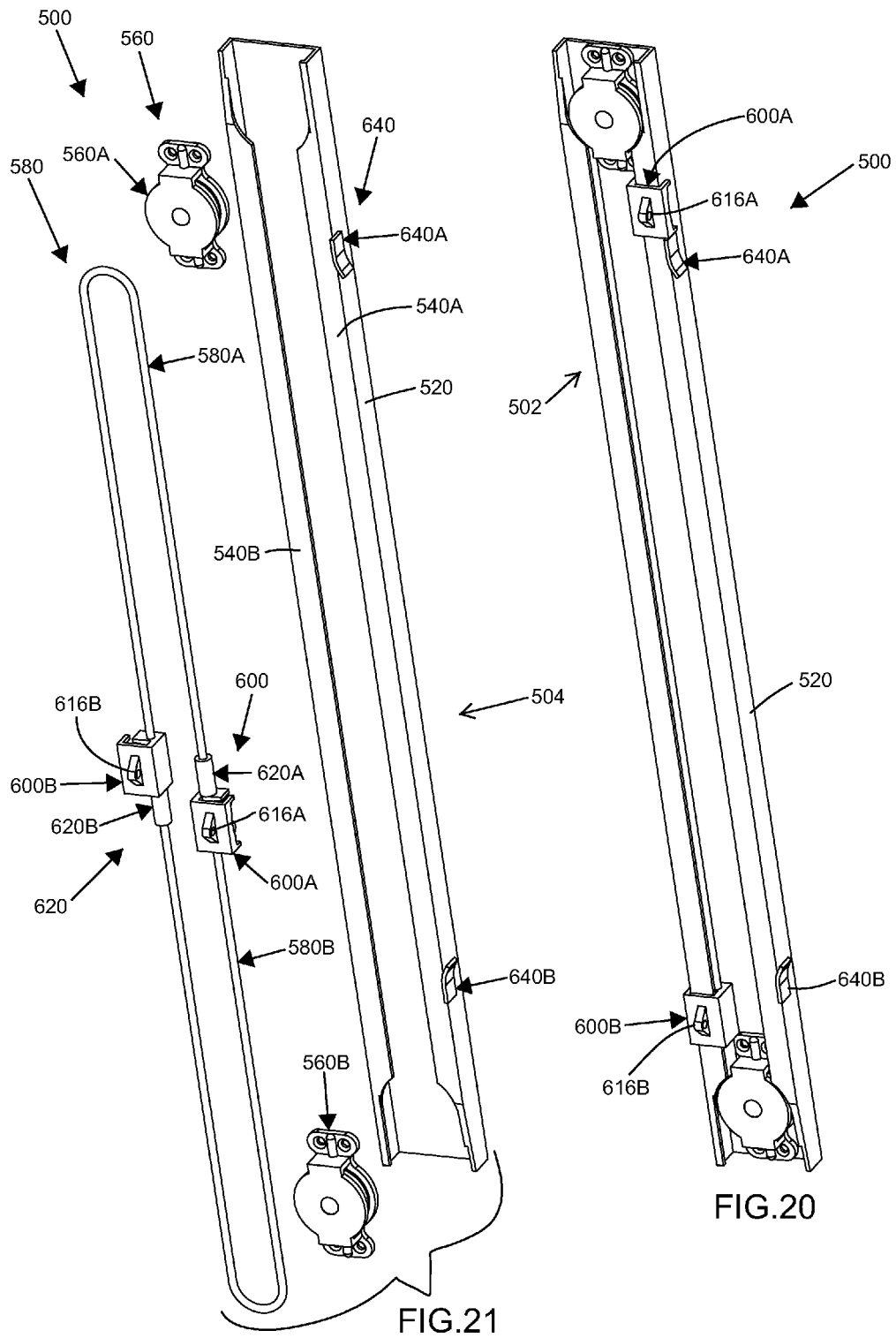
FIG. 20 is a perspective view of a pulley arrangement adapted for use with the aerodynamic drag reducing apparatus of FIG. 1, the pulley arrangement illustrated in the deployed configuration, according to the principles of the present disclosure.
FIG. 21 is the perspective view of FIG. 20, but exploded and with the pulley arrangement illustrated in the intermediate configuration.
Figure 36:
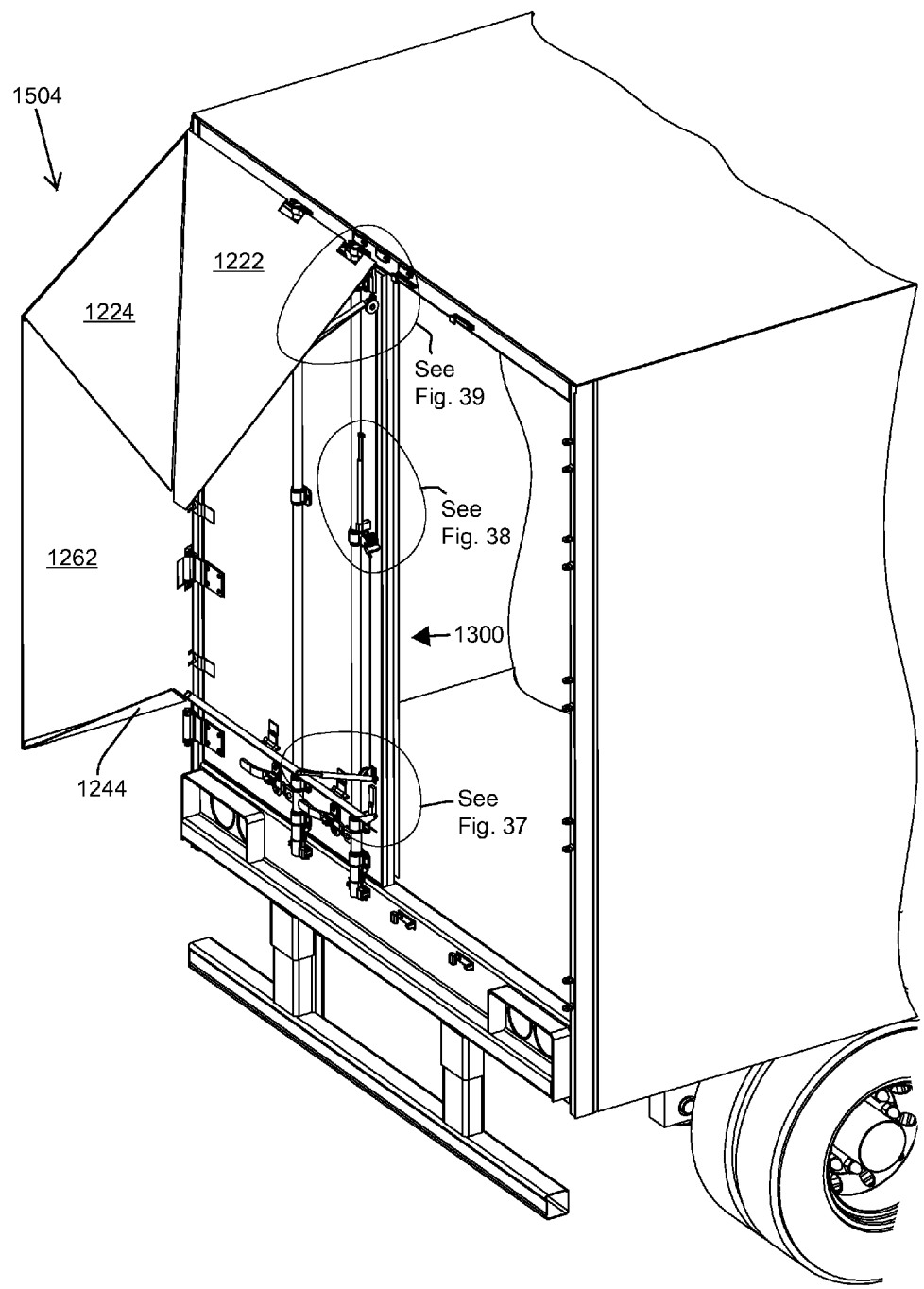
FIG. 36 is the partial perspective view of FIG. 28, but with the aerodynamic drag reducing apparatus illustrated in an intermediate configuration.
Figure 40:
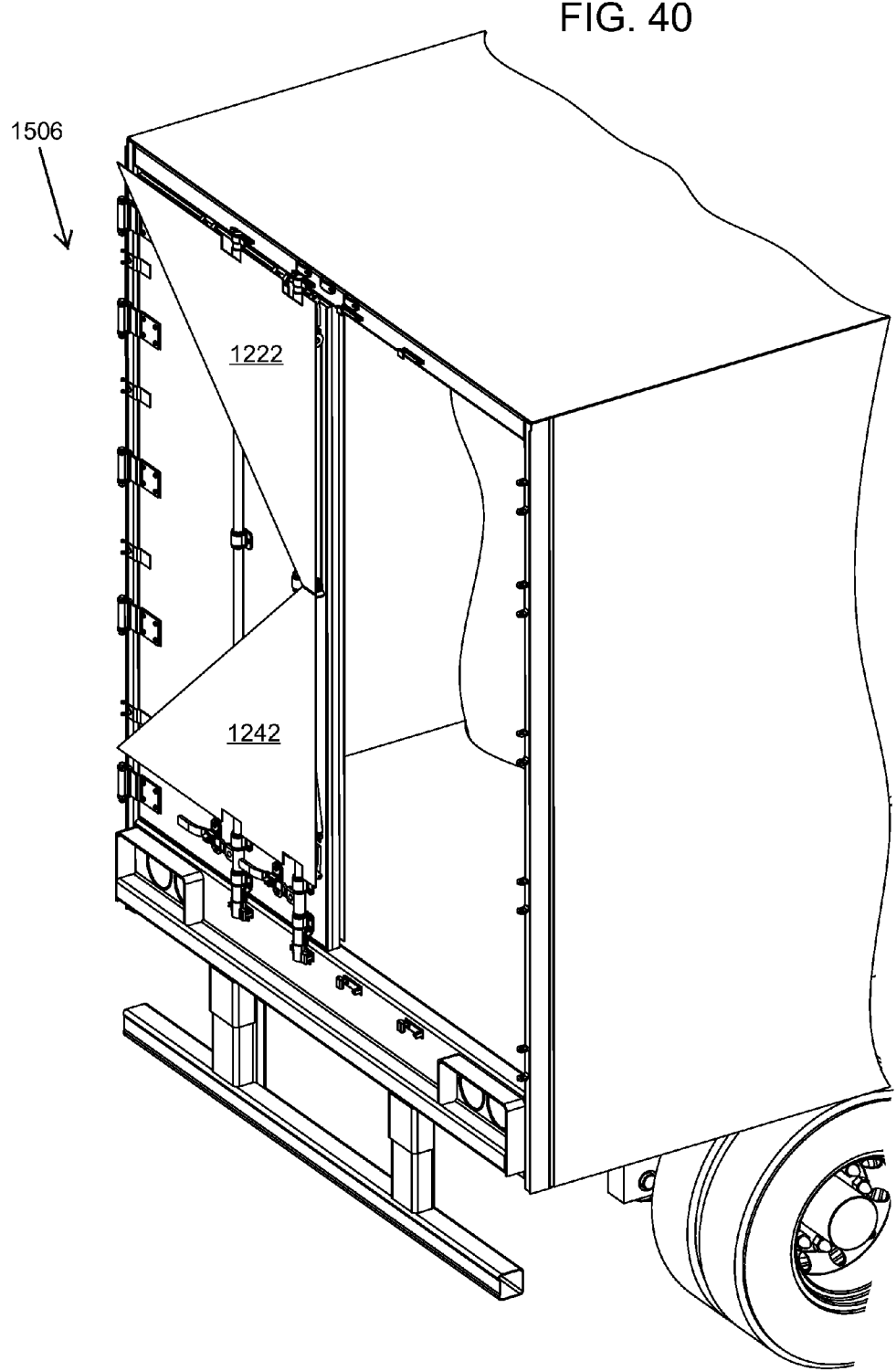
FIG. 40 is the partial perspective view of FIG. 28, but with the aerodynamic drag reducing apparatus illustrated in a stowed configuration, and with certain panels of the aerodynamic drag reducing apparatus removed.
Figure 47:
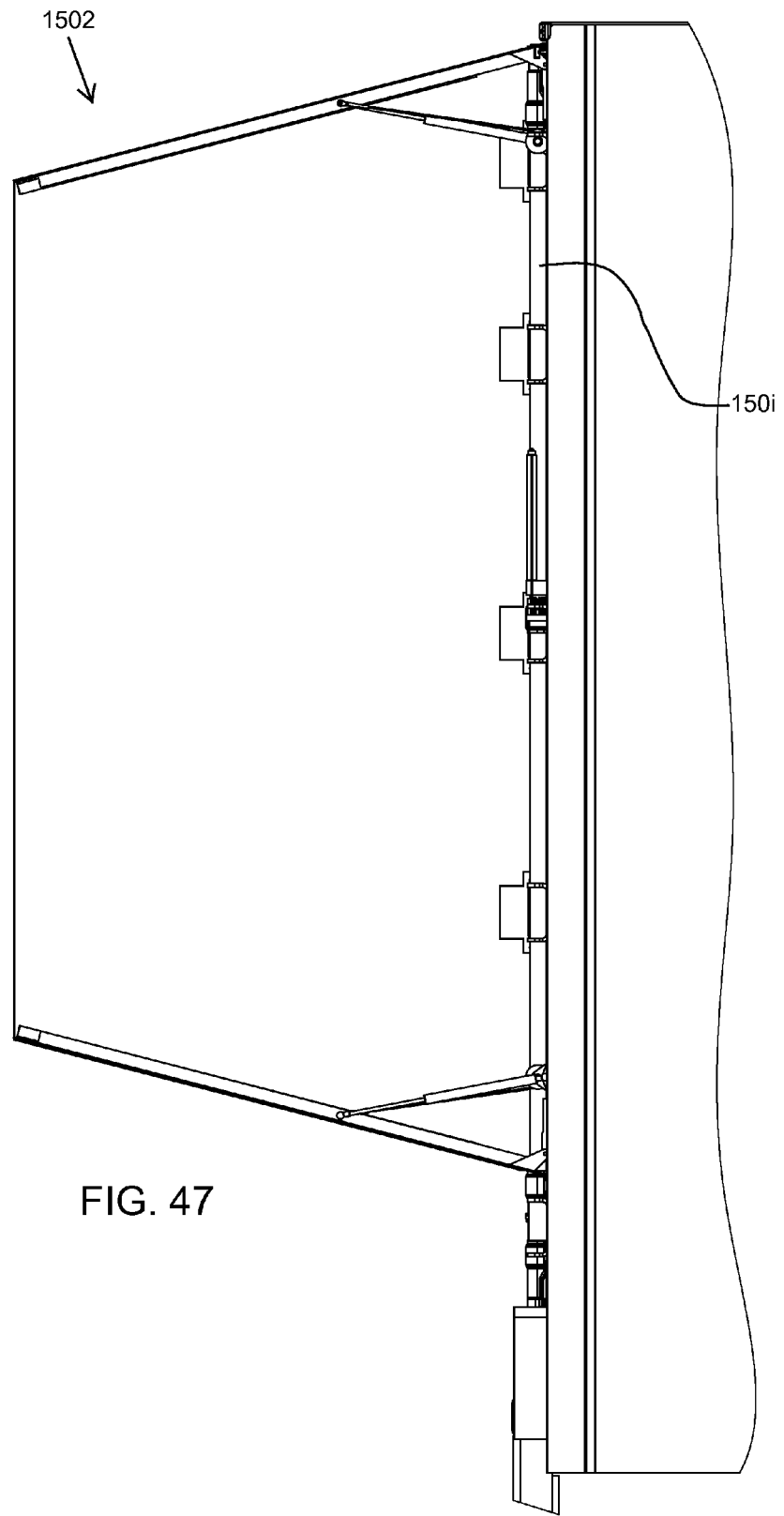
FIG. 47 is a partial right side elevation view of the aerodynamic drag reducing apparatus of FIG. 28, the aerodynamic drag reducing apparatus illustrated in the deployed configuration.
Figure 51:
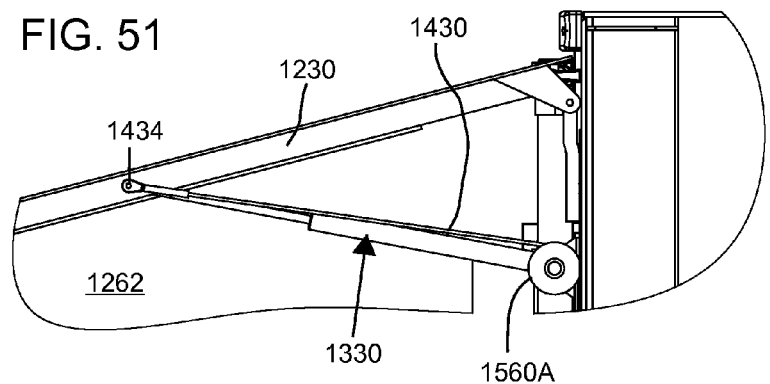
FIG. 51 is an enlarged portion of FIG. 48.
Figure 50:
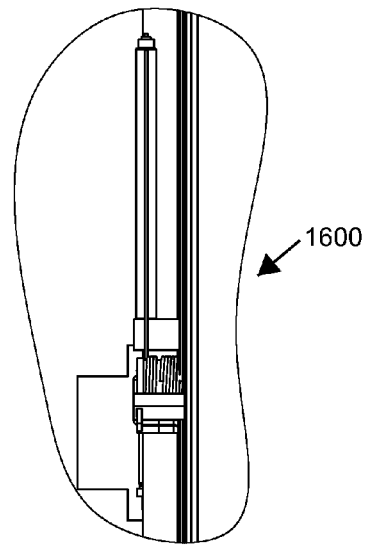
FIG. 50 is an enlarged portion of FIG. 48.
Figure 49:
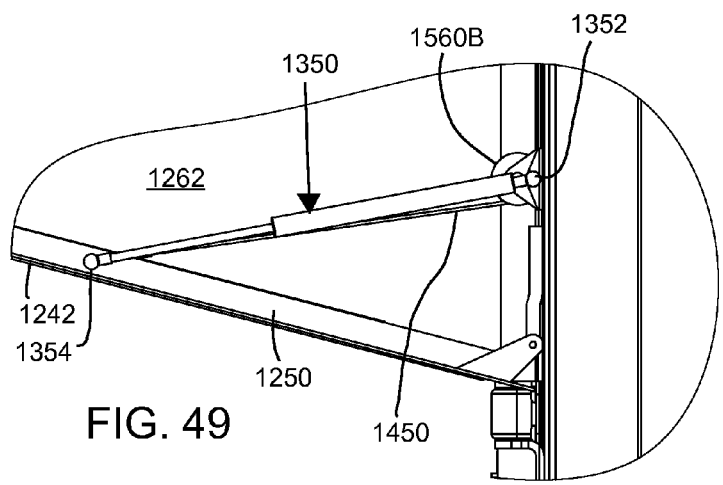
FIG. 49 is an enlarged portion of FIG. 48.
Figure 52:
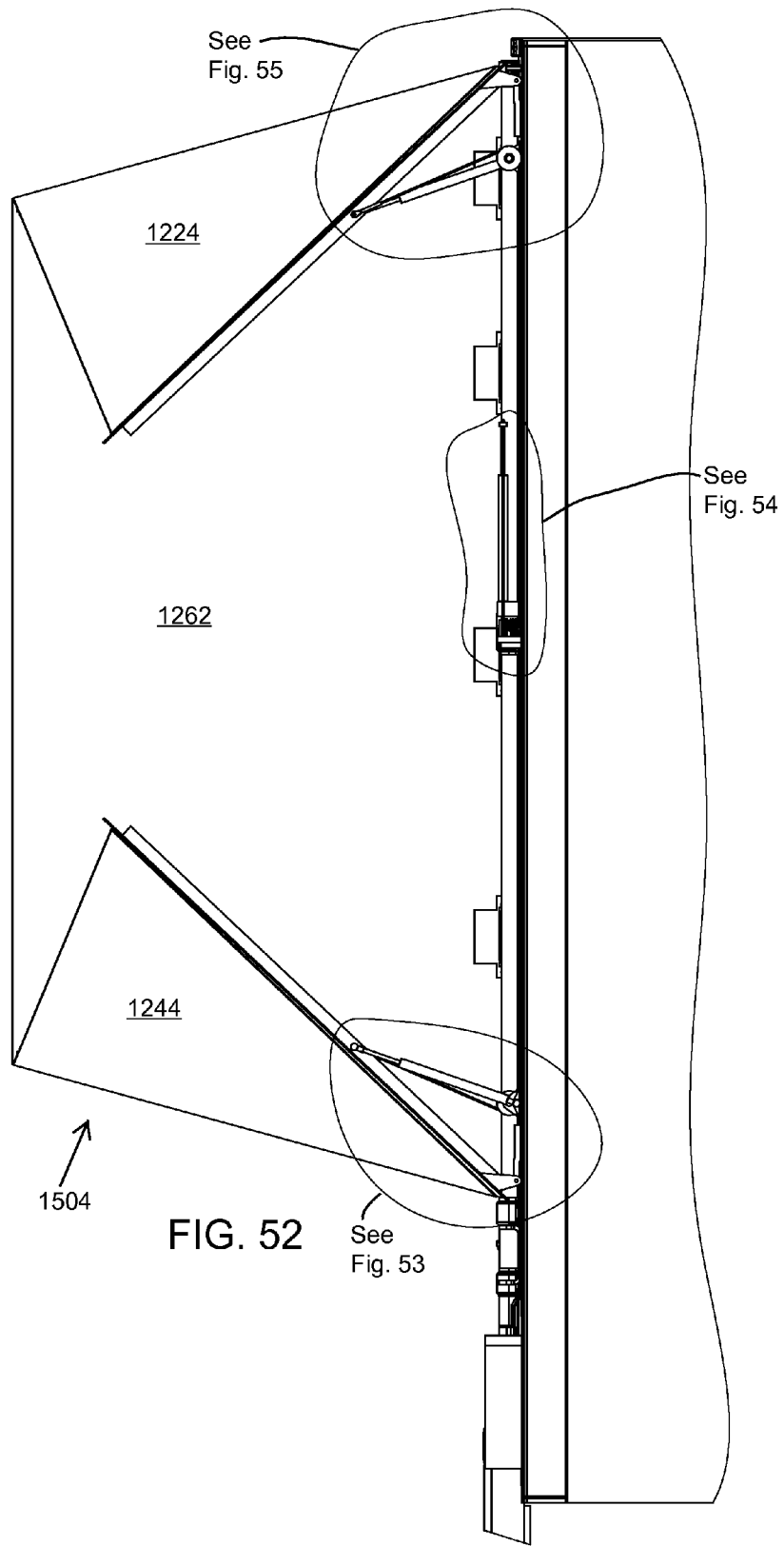
FIG. 52 is the partial right side elevation view of FIG. 47, but with the aerodynamic drag reducing apparatus illustrated in the intermediate configuration.
Figure 55:
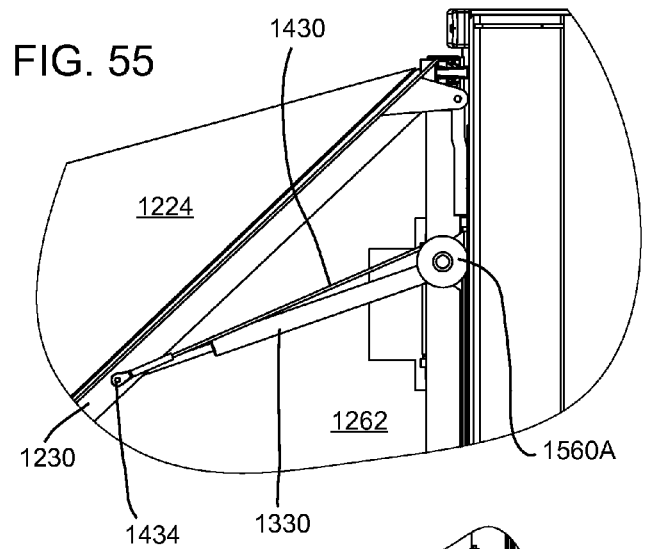
FIG. 55 is an enlarged portion of FIG. 52.
Figure 54:
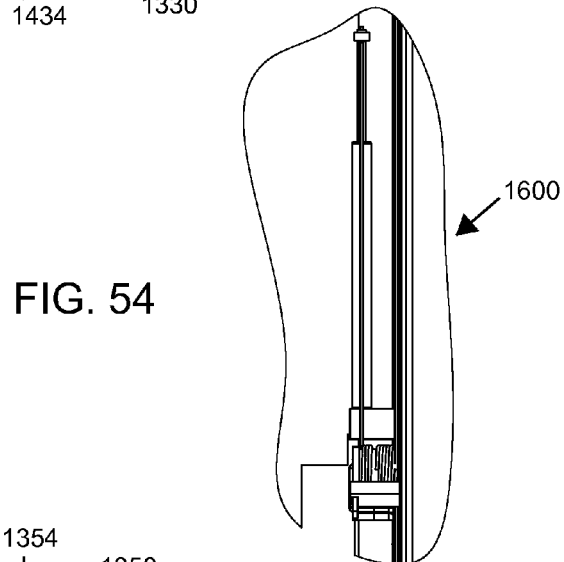
FIG. 54 is an enlarged portion of FIG. 52.
Figure 53:
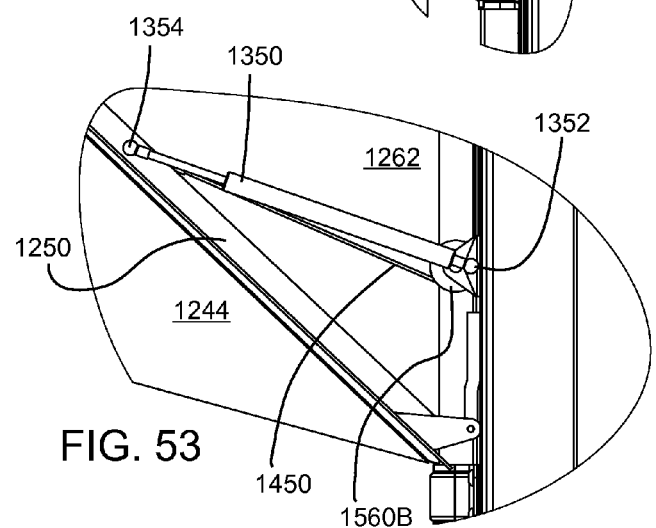
FIG. 53 is an enlarged portion of FIG. 52.
Figures 56, 57, 58:
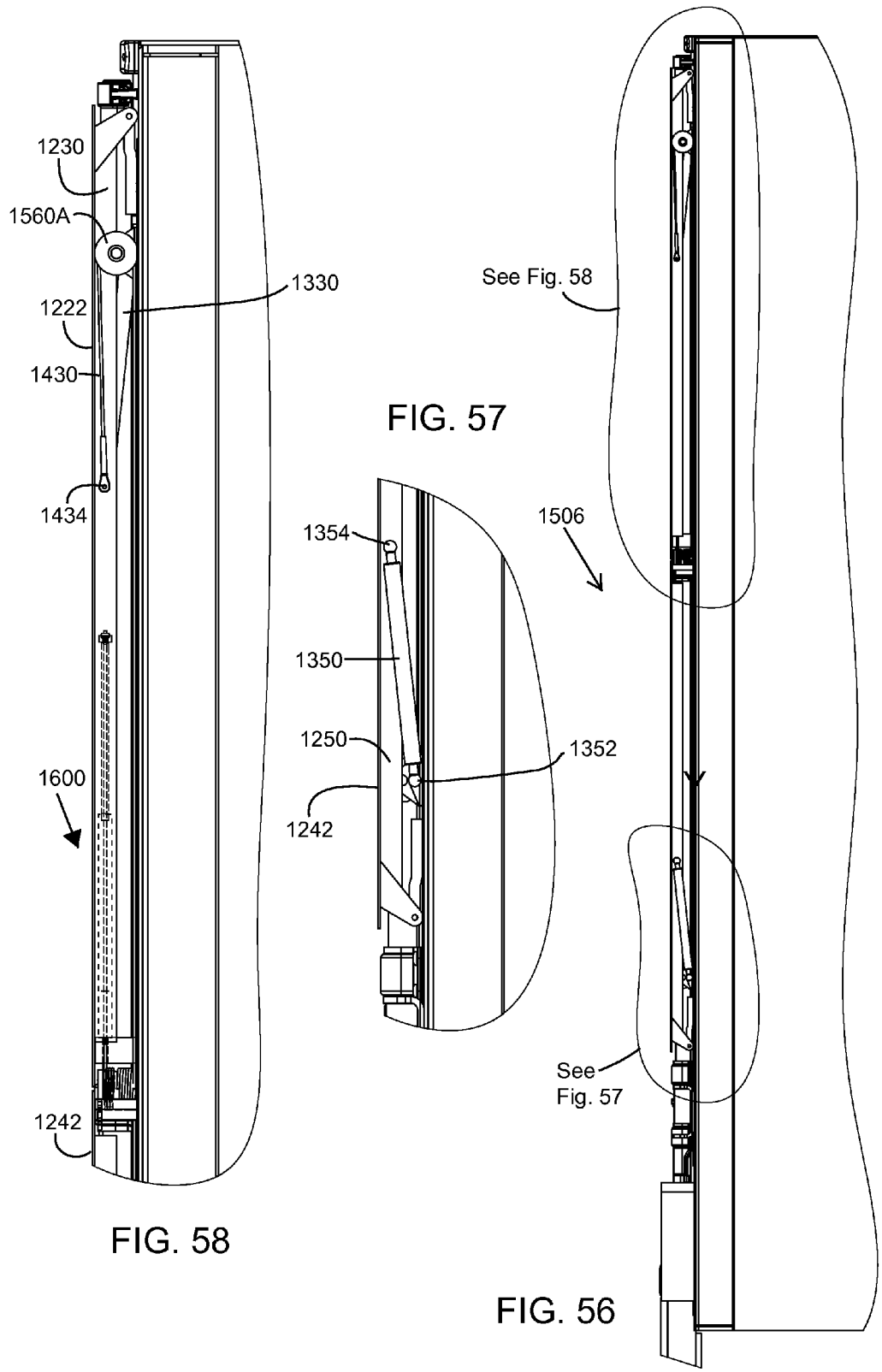
FIG. 56 is the partial right side elevation view of FIG. 47, but with the aerodynamic drag reducing apparatus illustrated in the stowed configuration, and with the certain panels of the aerodynamic drag reducing apparatus removed.
FIG. 57 is an enlarged portion of FIG. 56.
FIG. 58 is an enlarged portion of FIG. 56.

The actuator set 420 may include a first actuator member 430 and a second actuator member 450 (see FIG. 17). As depicted, the actuator members 430, 450 may be rods of a fixed length. In other embodiments, the actuator members 430, 450 may be a cable, a chain, and/or other flexible tension member. In certain embodiments, one or both of the actuator members 430, 450 may support compressive loads. In certain embodiments, one or both of the actuator members 430, 450 may support only tensile loads. As depicted, the actuator member 430 extends between a first end 432 and a second end 434. Attachment points may be included at the ends 432, 434. Likewise, the actuator member 450 extends between a first end 452 and a second end 454. Attachment points may be included at the ends 452, 454.

Turning now to FIGS. 20-27, the pulley arrangement 500 will be described. As depicted, the pulley arrangement 500 includes a pulley set 560 with a first pulley assembly 560A and a second pulley assembly 560B (see FIG. 21). The pulley set 560 is mounted to a mount 520 which, in turn, may be mounted to the vehicle 100 and/or the door 130 of the vehicle 100 (e.g., in the depicted embodiment). In other embodiments, the pulley set 560 may be directly mounted to the vehicle 100 and/or the door 130 of the vehicle 100.

Routed around the pulley set 560 is a cable set 580. As depicted, the cable set 580 may include a first cable assembly 580A and a second cable assembly 580B. The cable assemblies 580A and 580B may be interchangeable with each other. In certain embodiments, the cable assemblies 580A and 580B may be replaced with a single cable assembly. Cables of the cable assemblies 580A, 580B may include wire rope, cord, rope, and/or other suitable tension member adapted for routing between pulleys. In other embodiments, the cables of the cable assemblies 580A, 580B may be replaced with other suitable tension members (e.g., chains, belts, timing belts, etc.).

The mount 520 may include a generally extruded shape. The mount 520 may support substantial loads generated by the cable set 580 mounted over the pulley set 560. For example, the cable set 580 may include an adjuster/tensioning set 620. The adjuster/tensioning set 620 may include a first adjuster/tensioner 620A and/or a second adjuster/tensioner 620B. By tightening the adjuster/tensioning set 620, substantial tensile loads (i.e., preloads) may be developed in the cable set 580. The tensile loads in the cable set 580 may be supported by compressive loads within the mount 520. The tensile loads in the cable set 580 may be more than 5 times greater than forces required to move and/or hold the panels 222, 242. The tensile loads in the cable set 580 may be more than 10 times greater than the forces required to move and/or hold the panels 222, 242. In certain embodiments, the generally extruded shape of the mount 520 includes a centroid that is positioned at or near to a center of the compressive loads supporting the tensile loads of the cable set 580. The mount 520 may thereby support the tensile loads within the cable set 580 without bending or substantially distorting or deforming. The mount 520 may be attached to the vehicle 100 and/or the door 130 of the vehicle 100 with suitable fasteners. Alternatively, the mount 520 may be incorporated into the vehicle 100 and/or the door 130 of the vehicle 100.

As depicted, the mount 520 may include a rail set 540. The rail set 540 may include a first rail 540A and a second rail 540B. The pulley set 500 may further include a car set 600. The car set 600 may include a first car 600A and a second car 600B. The cars 600A, 600B may each include a set of wheels 610 to reduce friction as the cars 600A, 600B move along the rails 540A, 540B, respectively. The car 600A may include an attachment point 616A. Likewise, the car 600B may include an attachment point 616B. As depicted, the cars 600A, 600B move oppositely with respect to each other along the rails 540A, 540B, respectively.

The pulley set 500 may further include a latch set 640. The latch set 640 may include a first latch 640A and a second latch 640B. The latch set 640 may serve to latch the pulley set 500 into the deployed configuration 502 and/or the stowed configuration 506. By latching the pulley set 500 into the deployed configuration 502 and/or the stowed configuration 506, the aerodynamic assembly 200 may be held at the deployed configuration 502 and/or the stowed configuration 506, respectively. The first latch 640A and/or the second latch 640B may be remotely released and/or applied.

The pulley set 500 may further include a stop set 660. As depicted, the stop set 660 may include a first stop 660A and/or a second stop 660B. The stop set 660 may serve to limit travel of the car set 600 along the rail set 540 and thereby keep the pulley set 500 and/or the aerodynamic assembly 200 from overextending and/or otherwise becoming positioned in an undesired configuration.

As depicted, the actuator arrangement 300 may generally be positioned at the area between the lock-rods 174 and/or the inboard area 172 of the rear surface 170 of the door 130 (see FIG. 11). The actuator arrangement 300 may generally lie within a recess defined by and/or between the lock-rods 150 when the aerodynamic assembly 200 is at the stowed configuration 506. By occupying a space adjacent and/or between the lock-rods 150, the actuator arrangement 300 need not occupy additional space that may prevent the doors 300 from fully opening against the sides 102, 104 of the vehicle 100. Furthermore, as depicted, various components of the actuator arrangement 300 need not cross over the lock-rods 150, thereby saving space that may otherwise be lost to various components on the doors 300 stacking upon each other. To further conserve space, the actuator 330 may be positioned opposite the actuating member 430 about the frame 230. Likewise, the actuator 350 may be positioned opposite the actuator member 450 about the frame 250. To further conserve space, the actuator 330 may occupy an upper region when the aerodynamic assembly 200 is at the stowed configuration 506. Likewise, the actuator 350 may occupy a lower region when the aerodynamic assembly 200 is at the stowed configuration 506. The pulley set 500 may occupy a central region between the upper region and the lower region to conserve space and otherwise avoid substantially overlapping the actuators 330, 350.

Connections will now be described between the actuator arrangement 300 and the panel arrangements 220, 240. Connections within the actuator arrangement 300 will also be described. The attachment point at the first end 332 of the actuator 330 is connected to a mount on the vehicle 100. Likewise, the attachment point at the first end 352 of the actuator 350 is connected to a mount on the vehicle 100. As depicted, the mounts are mounted to the door 130 of the vehicle 100, and the connections include spherical joints. In other embodiments, the mounts may be incorporated into the mount 520. In certain embodiments, a cylindrical joint may be used. The attachment point at the second end 334 of the actuator 330 is connected to the second attachment point 234 of the panel 222. Likewise, the attachment point at the second end 354 of the actuator 350 is connected to the second attachment point 254 of the panel 242. As depicted, the connection includes a spherical joint. In certain embodiments, the connection may include a cylindrical joint.

As depicted, the attachment point at the first end 432 of the actuator member 430 is connected to the attachment point 616B of the car 600B. Likewise, the attachment point at the first end 452 of the actuator member 450 is connected to the attachment point 616A of the car 600A. In other embodiments, the attachment point at the first end 432 of the actuator member 430 is connected to the cable set 580, and/or the attachment point at the first end 452 of the actuator member 450 is connected to the cable set 580. In certain embodiments, one or more wheels 610 may be mounted to the ends 432 and/or 452 of the actuator members 430 and/or 450. The wheel 610 may ride along the rails 540A and/or 540B. The connections may include spherical joints and/or cylindrical joints.

The attachment point at the second end 434 of the actuator member 430 is connected to the first attachment point 232 of the panel 222. Likewise, the attachment point at the second end 454 of the actuator member 450 is attached to the first attachment point 252 of the panel 242. The connections may include spherical joints and/or cylindrical joints.

As depicted, the attachment points 232 and 234 are separated and the attachment points 252 and 254 are separated. In other embodiments, the attachment points 232 and 234 and the attachment points 252 and 254 may be combined. As depicted, the actuator members 430 and 450 connect to the panels 222 and 242, respectively. In other embodiments, the actuator members 430, 450 may attach directly to the actuators 330 and/or 350, respectively. In particular, the second ends 434, 454 of the actuator members 430, 450 may attach to the second ends 334, 354 of the actuators 330, 350. The second ends 434, 454 of the actuator members 430, 450 may thereby not connect to the panels 222, 242.

As depicted, the actuator 330 is connected to the panel 222, and the actuator 350 is connected to the panel 242. In other embodiments, a single actuator may be used that is connected to either the panel 222 or the panel 242. In still other embodiments, an actuator (e.g., a gas cylinder) may be additionally or alternatively attached to one of the cars 600A, 600B.

In still other embodiments, the pulley assemblies 560A, 560B may be positioned at or near the first ends 332, 352 of the actuators 330, 350 and the actuator members 430, 450 may pull the actuators 330, 350 to a retracted position. In such embodiments, the actuator members 430, 450 may include flexible tension members, at least around the pulley assemblies 560A, 560B.

As depicted, the pulley set 500 includes a first pulley assembly 560A and a second pulley assembly 560B that do not accumulate or dispense excess length of cable but route the cables along a route of a substantially fixed length. In other embodiments, the pulley set 500 may include a right hand wound portion and a left hand wound portion that may accumulate and dispense lengths of cables. In such embodiments, the first and second actuator members 430, 450 of the actuator set 420 may include cables and/or other flexible members that may be wound respectively about the right hand and left hand wrapping areas of the pulley set 500.

As depicted, the panel 242 is a panel-like structure. In other embodiments, the panel 242 may be replaced by a frame or other open structure.

Turning now to FIGS. 28-40, the example vehicle 100 is illustrated with an example aerodynamic assembly 1200. As depicted, the aerodynamic assembly 1200 is adapted to mount to the doors 130 of the vehicle 100. As depicted, the aerodynamic assembly 1200 is mounted to the left door 130L of the vehicle 100. Not shown is a mirrored aerodynamic assembly and the right door of the vehicle 100 to which the mirrored aerodynamic assembly may be mounted. The mirrored aerodynamic assembly may be substantially a mirror image of the aerodynamic assembly 1200. The aerodynamic assembly 1200 may be similar to various aerodynamic assemblies and/or aerodynamic arrangements illustrated and described in the U.S. Patent Applications and/or the U.S. Patents incorporated by reference above. The aerodynamic assembly 1200 and the mirrored aerodynamic assembly are adapted for mounting on the rear end 108 of the vehicle 100. The aerodynamic assembly 1200 and the mirrored aerodynamic assembly generally extend between the first side 102 and the second side 104 of the vehicle 100. The aerodynamic assembly 1200 and the mirrored aerodynamic assembly are generally adjacent to the top 106 of the vehicle 100.

As illustrated, the aerodynamic assembly 1200 includes a top panel arrangement 1220, a bottom panel arrangement 1240, and a side panel arrangement 1260 (see FIG. 28). As depicted, the top panel arrangement 1220 includes a first panel 1222 hingedly connected to a second panel 1224. Likewise, the bottom panel arrangement 1240 may include a first panel 1242 hingedly connected to a second panel 1244. As depicted, the top panel arrangement 1220 and the bottom panel arrangement 1240 may substantially be mirror images of each other. In other embodiments, the top panel arrangement 1220 and the bottom panel arrangement 1240 are similar but different from each other. As depicted, the first panel 1222 and the first panel 1242 are hingely mounted to the door 130 of the vehicle 100 by hinges 1290 (see FIGS. 29 and 35). As illustrated, one of the hinges 1290 may be a high capacity hinge 1290*h*. The hinges 1290 on each of the respective panels 1222, 1242 allow the panels 1222, 1242 to fold inwardly together and outwardly away from each other. The first panel 1222 may include a frame 1230 or other similar structure (see FIG. 35). The frame 1230 may include a first attachment point 1232 and a second attachment point 1234. In certain embodiments, the attachment points 1232 and 1234 may be a single attachment point. As depicted, the attachment points 1232 and 1234 are on opposite sides of the frame 1230. Likewise, the first panel 1242 may include a frame 1250 (see FIG. 29). The frame 1250 may include a first attachment point 1252 and a second attachment point 1254. As depicted, the attachment points 1252 and 1254 are on opposite sides of the frame 1250. As depicted, both of the frames 1230, 1250 are directly attached to one of the high capacity hinges 1290*h*. In other embodiments, the frames 1230, 1250 may not necessarily directly attach to one of the hinges 1290.

As illustrated, the side panel arrangement 1260 of the aerodynamic assembly 1200 and a side panel arrangement of the mirrored aerodynamic assembly may include a single side panel 1262. In other embodiments, the side panel arrangement 1260 may include multiple side panels that may be hingedly connected to each other. As depicted, the side panel 1262 is hingely mounted to the door 130 of the vehicle 100 by hinges (see FIG. 28). In other embodiments, the side panel 1262 is hingely mounted to the vehicle 100. In certain embodiments, the side panel 1262 is hingely mounted to hinge pins of door hinges of the vehicle 100. In certain embodiments, the side panel 1262 is hingely mounted along a common axis with the hinge pins of the door hinges of the vehicle 100. As depicted, the second panel 1224 may be hingedly connected to the side panel 1262. As depicted, the second panel 1244 may be hingedly connected to the side panel 1262.

The aerodynamic assembly 1200 may be configured in a deployed configuration 1502, an intermediate configuration 1504, or a stowed configuration 1506. The deployed configuration 1502 generally configures the aerodynamic assembly 1200 in a drag reducing configuration. The stowed configuration 1506 generally configures the aerodynamic assembly 1200 in a compact configuration and/or in a configuration that allows the doors 130 to be opened against the sides 102, 104 of the vehicle 100.

To facilitate movement of the panel 1222 and/or the panel 1242, an actuator arrangement 1300 may be provided. The actuator arrangement 1300 may include an actuator set 1320, a tension member set 1420, a pulley set 1500, and a tensioner set 1600 (see FIGS. 28 and 32). The actuator set 1320 may include a first actuator 1330 and a second actuator 1350 (see FIGS. 29 and 31). As depicted, the actuators 1330, 1350 may be gas springs. In certain embodiments, the actuators 1330, 1350 may be a fluid actuated cylinder (e.g., a pneumatic cylinder or a hydraulic cylinder). As depicted, the actuators 1330, 1350 may be biased to extend. In other embodiments, the actuators 1330, 1350 may be biased to retract. In other embodiments, the actuator 1330 may be biased to extend and the actuator 1350 may be biased to retract. In still other embodiments, the actuator 1330 may be biased to retract and the actuator 1350 may be biased to extend. Torsion springs (not shown) may be included that act along some or all of the hinges 1290. The torsion springs may oppose the actuators 1330, 1350 and/or may assist the actuators 1330, 1350. The actuator 1330 includes a first end 1332 and a second end 1334. As depicted, attachment points (e.g., spherical joints and/or cylindrical joints) may be included at the ends 1332, 1334. Likewise, the actuator 1350 includes a first end 1352 and a second end 1354. Attachment points may be further included at the ends 1352, 1354.

The tension member set 1420 may include a first tension member 1430 and a second tension member 1450 (see FIGS. 29 and 31). As depicted, the tension members 1430, 1450 may be cables (i.e., wire rope) of a fixed length. In other embodiments, the tension members 1430, 1450 may be a belt, a chain, and/or other flexible tension member. As depicted, the tension members 1430, 1450 support only tensile loads. As depicted, the tension member 1430 extends between a first end 1432 and a second end 1434. Attachment points may be included at the ends 1432, 1434. Likewise, the tension member 1450 extends between a first end 1452 and a second end 1454. Attachment points may be included at the ends 1452, 1454.

Turning now to FIGS. 29 and 31, the pulley arrangement 1500 will be described. As depicted, the pulley arrangement 1500 includes a pulley set 1560 with a first pulley assembly 1560A and a second pulley assembly 1560B (see FIGS. 29 and 31). The pulley assemblies 1560A, 1560B are each mounted to a mount 1520 which, in turn, may be mounted to the vehicle 100 and/or the door 130 of the vehicle 100 (e.g., in the depicted embodiment). In other embodiments, the pulley assemblies 1560A, 1560B may be directly mounted to the vehicle 100 and/or the door 130 of the vehicle 100.

The tension members 1430, 1450 are routed around the pulley assemblies 1560A, 1560B, respectively. The tension members 1430, 1450 may be interchangeable with each other. In certain embodiments, the tension members 1430, 1450 may be replaced with a single tension member. The pulley assemblies 1560A, 1560B support loads generated by the tension members 1430, 1450, respectively. The tension members 1430, 1450 may include an adjuster/tensioning member. By tightening the adjuster/tensioning member, tensile loads (i.e., preloads) may be developed in the tension members 1430, 1450. The tensile loads in the tension members 1430, 1450 may be supported by the mounts 1520, respectively. The mount 1520 may be attached to the vehicle 100 and/or the door 130 of the vehicle 100 with suitable fasteners. Alternatively, the mount 1520 may be incorporated into the vehicle 100 and/or the door 130 of the vehicle 100.

Turning now to FIGS. 30, 34, 38, 42, 44, 46, 50, 54, and 58, the tensioner set 1600 will be described. In the depicted embodiment, the tensioner set 1600 includes a drum 1620 (e.g., a cable drum), a tensioning actuator 1670, a base 1680, a tensioner attachment member 1682, and a tension member 1690. The drum 1620 extends along an axis A6 between a first end 1622 and a second end 1624 (see FIGS. 34 and 38). As depicted, the axis A6 is substantially perpendicular to the rear surface 170 of the door 130. The first end 1622 is depicted adjacent the surface 170 of the door 130. The second end 1624 is spaced away from the surface 170 of the door 130. The drum 1620 includes a wrapping portion 1626.

The wrapping portion 1626 includes accommodations to wrap the tension members 1430, 1450, and 1690. As depicted, the tension members 1430, 1450, 1690 are wrapped around the wrapping portion 1626 in a left-hand helical direction. In other embodiments, the tension members 1430, 1450, 1690 may wrap around the wrapping portion 1626 in a right-hand helical direction. In still other embodiments, certain of the tension members 1430, 1450, 1690 may wrap in the left-hand helical direction while others may wrap in the right-hand helical direction. As depicted, the tension members 1430, 1450 may run together around the wrapping portion 1626, but rotationally spaced apart from each other by 180 degrees about the axis A6. The tension members 1430, 1450 thereby form a double helix (i.e., a twin pitch) around the wrapping portion 1626 about the axis A6. In certain embodiments, the drum 1620 may include male threads that may accommodate the tension members 1430, 1450, 1690. In embodiments that include the tension members 1430, 1450 forming a double helix, the threads may include a double pitch thread, at least in the wrapping portion 1626 area that wraps the tension members 1430, 1450. An example drum that may serve as the drum 1620 is produced by Todco of Marion, Ohio and is known as a standard cable drum with part number C-51040. In certain embodiments, the drum 1620 includes an attachment point 1632, an attachment point 1652, and an attachment point 1662.

In the depicted embodiment, as seen from the rear of the vehicle 100, the drum 1620 accumulates the tension members 1430 and 1450 and dispenses the tension member 1690 when rotated in the clockwise direction. Conversely, the drum 1620 dispenses the tension members 1430 and 1450 and accumulates the tension member 1690 when rotated in the counter-clockwise direction. In the depicted embodiment, the tension members 1430, 1450, 1690 are accumulated/dispensed at substantially a same rate. In other embodiments, the tension members 1430, 1450, 1690 may be dispensed/accumulated at different rates. In the depicted embodiment, the wrapping portion 1626 of the drum 1620 is substantially cylindrical. In other embodiments, the wrapping portion 1626 may be non-cylindrical. The ratios in which the tension members 1430, 1450, 1690 are dispensed may thereby vary in relation to each other and/or vary in relation to an angular position of the drum 1620 about the axis A6. Thus, the tension members 1430, 1450, 1690 may be geared toward each other in substantially identical proportions, in non-identical but constant proportions, or in varying proportions. As depicted at FIG. 34, the second end 1624 of the drum 1620 includes a catch 1644.

Turning now to FIGS. 38, 42, 44, and 46, the tensioner actuator 1670 will be described. As depicted, the tensioner actuator 1670 (i.e., an extension actuator) is a gas spring that operates by supplying an extension load (i.e. a load that places the tensioner actuator 1670 in compression) and thereby urges a second end 1674 of the tensioner actuator 1670 away from a first end 1672 of the tensioner actuator 1670. In other embodiments, the tensioner actuator 1670 may be replaced by a tensioner actuator that draws a first end of the tensioner actuator toward a second end of the tensioner actuator (i.e. a retraction actuator that generates a load that places the tensioner actuator in tension). Extension actuators may be lower in cost than retraction actuators. However, a retraction actuator may provide simpler mounting as tension in the retraction actuator may be aligned with tension in the tension member 1690.

As depicted, the tensioner actuator 1670 urges the drum 1620 to rotate in the clockwise direction as viewed from the rear of the vehicle 100. To accomplish this, the tensioner actuator 1670 is mounted to the base 1680 at the first end 1672. At the second end 1674 of the tensioner actuator 1670, the tensioner attachment member 1682 is mounted. The tensioner attachment member 1682 is attached to a second end 1694 of the tension member 1690, and the first end 1692 of the tension member 1690 is attached at the attachment point 1662 of the wrapping portion 1626 of the drum 1620. Extension of the tensioner actuator 1670 thereby urges the tension member 1690 to unwrap from the drum 1620 and thereby rotate the drum 1620.

As depicted, the drum 1620 is urged to rotate by the tensioner actuator 1670. In other embodiments, a linear spring (e.g., a compression spring or a tension spring) may replace the tensioner actuator 1670. In other embodiments, a rotary actuator may act along the axis A6 and thereby urge the drum 1620 to rotate. The rotary actuator may include a motor and/or a gearbox. In certain embodiments, the drum 1620 may be urged to rotate by a torsion spring (e.g., positioned inside the wrapping portion 1626).

As depicted, the first end 1432 of the tension member 1430 is attached at the attachment point 1632. Likewise, the first end 1452 of the tension member 1450 is attached at the attachment point 1652. In other embodiments, the tension member 1430 and the tension member 1450 may be combined into a single tension member. The single tension member may pass through a hole or other passage in the drum 1620.

As depicted, the tension members 1430, 1450 are accumulated by and dispensed from the wrapping portion 1626 of the drum 1620. In other embodiments, the tension members 1430, 1450 may be attached to the pulley set 500, described above. In particular, the first end 1432 of the tension member 1430 may be attached to the attachment point 616A, and the first end 1452 of the tension member 1450 may be attached to the attachment point 616B. Furthermore, the cable set 580 of the pulley set 500 may be urged to move (e.g., to circulate in a clockwise direction) by attaching the tensioner actuator 1670 to the cable set 580 (e.g., attach the second end 1674 of the tensioner actuator 1670 to the attachment point 616B).

As depicted, the tension members 1430, 1450 are routed across the pulley assemblies 1560A, 1560B, respectively, on their way to the first attachment points 1232, 1252, respectively. In other embodiments, the tension members 1430, 1450 may be directly routed to the first attachment points 1232, 1252. As depicted, the second ends 1434, 1454 may be attached to the first attachment points 1232, 1252, respectively. In other embodiments, the second ends 1434, 1454 may be directly attached to the second ends 1334, 1354, respectively, of the actuators 1330, 1350. As depicted, the pulley assemblies 1560A, 1560B are mounted at or near the first ends 1332, 1352 of the actuators 1330, 1350. In other embodiments, the pulley assemblies 1560A, 1560B may be mounted at other locations.

The tensioner set 1600 may further include a latch set 1640 (see FIG. 34). The latch set 1640 may include a latch 1642 that engages the catch 1644. The latch set 1640 may serve to latch the tensioner set 1600 to the deployed configuration 1502 and/or the stowed configuration 1506. By latching the tensioner set 1600 at the deployed configuration 1502 and/or the stowed configuration 1506, the aerodynamic assembly 1200 may be held at the deployed configuration 1502 and/or the stowed configuration 1506, respectively. As the drum 1620 may rotate about the axis A6 a plurality of revolutions, the catch 1644 may serve both to keep the aerodynamic assembly 1200 at the deployed configuration 1502 and the stowed configuration 1506. In other embodiments, two of the catches 1644 and/or two of the latches 1642 may be provided, a first to keep the aerodynamic assembly 1200 at the deployed configuration 1502 and a second to keep the aerodynamic assembly 1200 at the stowed configuration 1506. The latch 1642 may be remotely released and/or applied.

The tensioner set 1600 may further include a stop set (not shown). As depicted, the stop set may include a first stop and/or a second stop. The stop set may serve to limit travel of the tensioner set 1600 and thereby keep the tensioner set 1600 and/or the aerodynamic assembly 1200 from overextending and/or otherwise becoming positioned in an undesired configuration.

As depicted, the actuator arrangement 1300 may generally be positioned at the inboard area 172 and/or the area between the lock-rods 174 of the rear surface 170 of the door 130 (see FIGS. 28-31). The actuator arrangement 1300 may generally lie within a recess defined by and/or between the lock-rod(s) 150 when the aerodynamic assembly 1200 is at the stowed configuration 1506. By occupying a space adjacent and/or between the lock-rods 150, the actuator arrangement 1300 need not occupy additional space that may prevent the doors 300 from fully opening against the sides 102, 104 of the vehicle 100. Furthermore, as depicted, various components of the actuator arrangement 1300 need not cross over the lock-rods 150, thereby saving space that may otherwise be lost to various components on the doors 300 stacking upon each other. To further conserve space, the actuator 1330 may be positioned opposite the tension member 1430 about the frame 1230. Likewise, the actuator 1350 may be positioned opposite the tension member 1450 about the frame 1250. To further conserve space, the actuator 1330 may occupy an upper region when the aerodynamic assembly 1200 is at the stowed configuration 1506. Likewise, the actuator 1350 may occupy a lower region when the aerodynamic assembly 1200 is at the stowed configuration 1506. The tensioner set 1600 may occupy a central region between the upper region and the lower region to conserve space and otherwise avoid substantially overlapping the actuators 1330, 1350.

Connections will now be described between the actuator arrangement 1300 and the panel arrangements 1220, 1240. Connections within the actuator arrangement 1300 will also be described. The attachment point at the first end 1332 of the actuator 1330 is connected to one of the mounts 1520 on the vehicle 100. Likewise, the attachment point at the first end 1352 of the actuator 1350 is connected to one of the mounts 1520 on the vehicle 100. As depicted, the mounts 1520 are mounted to the door 130 of the vehicle 100, and the connections include spherical joints. In certain embodiments, a cylindrical joint may be used. As depicted, the mounts 1520 may mount both the pulley assemblies 1560A, 1560B, respectively, and the actuators 1330, 1350, respectively. In other embodiments, the pulley assemblies 1560A, 1560B and the actuators 1330, 1350 may be mounted separately. In still other embodiments, the actuators 1330, 1350 and the pulley assemblies 1560A, 1560B may both be mounted on a base 1292 of the hinge 1290 (e.g., of the high capacity hinge 1290h), respectively. The attachment point at the second end 1334 of the actuator 1330 is connected to the second attachment point 1234 of the panel 1222. Likewise, the attachment point at the second end 1354 of the actuator 1350 is connected to the second attachment point 1254 of the panel 1242. As depicted, the connection includes a spherical joint. In certain embodiments, the connection may include a cylindrical joint.

As depicted, the attachment point at the first end 1432 of the tension member 1430 is connected to the attachment point 1632 of the drum 1620. Likewise, the attachment point at the first end 1452 of the tension member 1450 is connected to the attachment point 1652 of the drum 1620. In other embodiments, the attachment point at the first end 1432 of the tension member 1430 is connected to the cable set 580, and/or the attachment point at the first end 1452 of the tension member 1450 is connected to the cable set 580.

The attachment point at the second end 1434 of the tension member 1430 is connected to the first attachment point 1232 of the panel 1222. Likewise, the attachment point at the second end 1454 of the tension member 1450 is attached to the first attachment point 1252 of the panel 1242. The connections may include spherical joints and/or cylindrical joints.

As depicted, the attachment points 1232 and 1234 are combined and the attachment points 1252 and 1254 are combined. In other embodiments, the attachment points 1232 and 1234 and the attachment points 1252 and 1254 may be separated. As depicted, the tension members 1430 and 1450 connect to the panels 1222 and 1242, respectively. In other embodiments, the tension members 1430, 1450 may attach directly to the actuators 1330 and/or 1350, respectively. In particular, the second ends 1434, 1454 of the tension members 1430, 1450 may attach to the second ends 1334, 1354 of the actuators 1330, 1350. In other embodiments, the second ends 1434, 1454 of the tension members 1430, 1450 may attach to the actuators 1330, 1350 at other locations, respectively. The second ends 1434, 1454 of the tension members 1430, 1450 may thereby not necessarily connect to the panels 1222, 1242.

The actuator 1330 may urge the panel 1222 toward the deployed configuration 1502. Likewise, the actuator 1350 may urge the panel 1242 toward the deployed configuration 1502. The tensioner actuator 1670 opposes the actuators 1330 and 1350 and thereby tends to urge the tensioner set 1600 toward the stowed configuration 1506. The tensioner actuator 1670 may have sufficient power to overcome either the actuator 1330 and/or the actuator 1350 individually. However, when acting together, via the tension members 1430, 1450, 1690 and the drum 1620, the actuators 1330 and 1350 overpower the tensioner actuator 1670 and move the panels 1222, 1242 toward the deployed configuration 1502.

To move the panels 1222, 1242 toward the stowed configuration 1506, either the panel 1222 or the panel 1242 may be manually or otherwise moved to the stowed configuration 1506. In manually or otherwise moving one of the panels 1222 or 1242, the corresponding actuator 1330 or 1350 is overpowered and moved toward the stowed configuration 1506. The remaining actuator 1350 or 1330 is then left opposing the tensioner actuator 1670 by itself. As the tensioner actuator 1670 is stronger than the individual remaining actuator 1350 or 1330, the remaining actuator 1350 or 1330 is forced to retract by the tensioner actuator 1670 and the other panel 1242 or 1222 is also moved to the stowed configuration 1506. In certain embodiments, the second panels 1224 and/or 1244 and/or the side panel 1262 also follow the panels 1222 and 1242 to the stowed configuration 1506. The latch 1642 may engage the catch 1644 to retain the stowed configuration 1506.

Upon releasing the manually or otherwise moved one of the panels 1222 or 1242 (or upon releasing the latch 1642), the actuators 1330 and 1350 together overpower the tensioner actuator 1670 and move the panels 1222, 1242 toward the deployed configuration 1502. In certain embodiments, the second panels 1224 and/or 1244 and/or the side panel 1262 also follow the panels 1222 and 1242 to the deployed configuration 1502.

In certain embodiments, one or more of the actuators 1330, 1350, and/or 1670 may be powered. By powering one or more of the actuators 1330, 1350, and/or 1670, the balance of forces between the actuators 1330, 1350, and 1670 can be selectively adjusted thereby causing the panels 1222, 1242 to move toward the deployed configuration 1502 and/or the stowed configuration 1506, as desired.

Gravity and/or aerodynamic loads on the aerodynamic assembly 1200 may be considered when sizing the actuators 1330, 1350, and/or 1670. If sized properly, the aerodynamic loads may self-deploy the aerodynamic assembly 1200 upon the vehicle 100 reaching a certain relative velocity with the air adjacent the vehicle 100.

As depicted, the actuator 1330 is connected to the panel 1222, and the actuator 1350 is connected to the panel 1242. In other embodiments, a single actuator 1330 may instead be used that is connected to the panel 1222. Gravity may serve as a deploying means for the panel 1242, rather than the actuator 1350.

As depicted, the pulley assemblies 1560A, 1560B may be positioned at or near the first ends 1332, 1352 of the actuators 1330, 1350 and the tension members 1430, 1450 may pull the actuators 1330, 1350 to a retracted position. In such embodiments, the tension members 1430, 1450 may include flexible tension members, at least around the pulley assemblies 1560A, 1560B.

As depicted, the panel 1242 is a panel-like structure. In other embodiments, the panel 1242 may be replaced by a frame or other open structure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An aerodynamic drag reducing apparatus adapted to mount to a rear end of a vehicle, the aerodynamic drag reducing apparatus further adapted to move between an extended configuration and a retracted configuration, the aerodynamic drag reducing apparatus comprising:
    an interconnected panel arrangement including a first panel, a second panel, a third panel, and a plurality of interconnections between the first panel, the second panel, and the third panel, wherein the first panel is rotatably connected to the rear end of the vehicle, wherein the third panel is rotatably connected to the rear end of the vehicle, and wherein movement of the interconnected panel arrangement between the extended configuration and the retracted configuration is coordinated by the plurality of interconnections;
    an actuator arrangement including a first actuator corresponding to the first panel and a second actuator corresponding to the third panel, wherein the first actuator is rotatably connected to the first panel and the second actuator is rotatably connected to the third panel; and
    an actuator coordination arrangement adapted to coordinate movement of the first actuator and the second actuator at least during a portion of when the aerodynamic drag reducing apparatus is moved from the extended configuration to the retracted configuration;

wherein the first actuator is a first linear actuator and the second actuator is a second linear actuator; and wherein the first linear actuator is a first gas spring and the second linear actuator is a second gas spring.

2. The aerodynamic drag reducing apparatus of claim 1, wherein the first panel is rotatably connected to a rear door of the rear end of the vehicle by a first hinge and wherein the third panel is rotatably connected to the rear door of the rear end of the vehicle by a second hinge.

3. The aerodynamic drag reducing apparatus of claim 2, further comprising a fourth panel and a fifth panel, wherein the plurality of interconnections are further between the fourth panel and the fifth panel and wherein the plurality of interconnections includes a plurality of hinges between adjoining panels of the interconnected panel arrangement.

4. The aerodynamic drag reducing apparatus of claim 2, wherein the second panel is rotatably connected to the rear door of the rear end of the vehicle by a third hinge.

5. The aerodynamic drag reducing apparatus of claim 1, wherein the first panel is a top panel, the second panel is a side panel, and the third panel is a bottom panel.

6. The aerodynamic drag reducing apparatus of claim 1, wherein the first panel and the third panel move inwardly together at least during the portion of when the aerodynamic drag reducing apparatus is moved from the extended configuration to the retracted configuration.

7. The aerodynamic drag reducing apparatus of claim 1, wherein the first actuator is rotatably connected to the rear end of the vehicle and the second actuator is also rotatably connected to the rear end of the vehicle.

8. The aerodynamic drag reducing apparatus of claim 7, wherein the first actuator is rotatably connected to the rear end of the vehicle by a first spherical joint, the second actuator is rotatably connected to the rear end of the vehicle by a second spherical joint, the first actuator is rotatably connected to the first panel by a third spherical joint, and the second actuator is rotatably connected to the third panel by a fourth spherical joint.

9. The aerodynamic drag reducing apparatus of claim 1, wherein the actuator coordination arrangement includes a first attachment to the first panel and a second attachment to the third panel.

10. The aerodynamic drag reducing apparatus of claim 9, wherein the actuator coordination arrangement includes a tension member arrangement with one or more tension member, wherein when moving the aerodynamic drag reducing apparatus from the extended configuration to the retracted configuration the tension member arrangement coordinates the first actuator and the second actuator.

11. The aerodynamic drag reducing apparatus of claim 10, wherein the first actuator produces a first extension load that urges the first panel toward the extended configuration and the second actuator produces a second extension load that urges the third panel toward the extended configuration and wherein tension within the tension member arrangement overcomes the first extension load at least during the portion of when the aerodynamic drag reducing apparatus is moved from the extended configuration to the retracted configuration.

12. The aerodynamic drag reducing apparatus of claim 11, wherein the first panel and the third panel move inwardly together at least during the portion of when the aerodynamic drag reducing apparatus is moved from the extended configuration to the retracted configuration.

13. The aerodynamic drag reducing apparatus of claim 11, wherein the tension within the tension member arrangement is produced when an operator moves the third panel toward the retracted configuration.

14. The aerodynamic drag reducing apparatus of claim 9, wherein the first panel includes a first frame portion and the third panel includes a second frame portion, wherein the first actuator is rotatably connected to the first frame portion of the first panel and the second actuator is rotatably connected to the second frame portion of the third panel, and wherein the first attachment of the actuator coordination arrangement is attached to the first frame portion of the first panel and the second attachment of the actuator coordination arrangement is attached to the second frame portion of the third panel.

15. A method for stowing an aerodynamic drag reducing apparatus behind a rear end of a vehicle, the method comprising:

providing an interconnected panel arrangement including a first panel, a second panel, a third panel, and a plurality of interconnections between the first panel, the second panel, and the third panel, wherein the first panel is rotatably connected to the rear end of the vehicle, wherein the third panel is rotatably connected to the rear end of the vehicle, and wherein movement of the interconnected panel arrangement between an extended configuration and a retracted configuration is coordinated by the plurality of interconnections;

providing an actuator arrangement including a first actuator corresponding to the first panel and a second actuator corresponding to the third panel, wherein the first actuator is rotatably connected to the first panel and the second actuator is rotatably connected to the third panel;

providing an actuator coordination arrangement adapted to coordinate movement of the first actuator and the second actuator at least during a portion of when the aerodynamic drag reducing apparatus is moved from the extended configuration to the retracted configuration;

moving the first panel of the aerodynamic drag reducing apparatus toward a stowed position and thereby compressing a first actuator and activating a tension member arrangement; and applying tension with the activated tension member arrangement to compress a second actuator and thereby moving a second panel of the aerodynamic assembly toward a stowed position;

wherein the first actuator is a first linear actuator and the second actuator is a second linear actuator; and wherein the first linear actuator is a first gas spring and the second linear actuator is a second gas spring.

16. The method of claim 15, wherein the first panel is rotatably connected to a rear door of the rear end of the vehicle by a first hinge and wherein the third panel is rotatably connected to the rear door of the rear end of the vehicle by a second hinge.

17. The method of claim 16, wherein the second panel is rotatably connected to the rear door of the rear end of the vehicle by a third hinge.

18. The method of claim 15, wherein the first panel is a top panel, the second panel is a side panel, and the third panel is a bottom panel.

19. The method of claim 15, wherein the first panel and the third panel move inwardly together at least during the portion of when the aerodynamic drag reducing apparatus is moved from the extended configuration to the retracted configuration.

20. The method of claim 15, wherein:

the actuator coordination arrangement includes a first attachment to the first panel and a second attachment to the third panel;

the actuator coordination arrangement includes a tension member arrangement with one or more tension member, wherein when moving the aerodynamic drag reducing apparatus from the extended configuration to the retracted configuration the tension member arrangement coordinates the first actuator and the second actuator;

the first actuator produces a first extension load that urges the first panel toward the extended configuration and the second actuator produces a second extension load that urges the third panel toward the extended configuration and wherein tension within the tension member arrangement overcomes the first extension load at least during the portion of when the aerodynamic drag reducing apparatus is moved from the extended configuration to the retracted configuration; and the first panel and the third panel move inwardly together at least during the portion of when the aerodynamic drag reducing apparatus is moved from the extended configuration to the retracted configuration.

\* \* \* \* \*